United States Patent
Verbin et al.

(10) Patent No.: US 10,057,024 B2
(45) Date of Patent: Aug. 21, 2018

(54) TRANSMISSION SCHEME FOR COMMUNICATION SYSTEMS

(71) Applicant: Sckipio Technologies S.I LTD, Ramat Gan (IL)

(72) Inventors: Rami Verbin, Tel Aviv-Yafo (IL); Guy Reina, Giv'atayim (IL); Ron Sterenson, Raanana (IL)

(73) Assignee: Sckipio Technologies S.I LTD, Ramat Gan (IL)

( * ) Notice: Subject to any disclaimer, the term of this patent is extended or adjusted under 35 U.S.C. 154(b) by 21 days.

(21) Appl. No.: 15/336,409

(22) Filed: Oct. 27, 2016

(65) Prior Publication Data

US 2017/0048035 A1    Feb. 16, 2017

Related U.S. Application Data

(63) Continuation of application No. 14/387,913, filed as application No. PCT/IB2013/052499 on Mar. 28, 2013, now Pat. No. 9,503,985.
(Continued)

(51) Int. Cl.
*H04B 7/00* (2006.01)
*H04L 5/00* (2006.01)
(Continued)

(52) U.S. Cl.
CPC ............ *H04L 5/0044* (2013.01); *H04B 1/38* (2013.01); *H04L 5/0005* (2013.01);
(Continued)

(58) Field of Classification Search
CPC ..... H04L 12/54; H04L 12/5693; H04W 76/02
(Continued)

(56) References Cited

U.S. PATENT DOCUMENTS 5,594,720 A * 1/1997 Papadopoulos ...... H04B 7/2656
370/330
6,016,311 A   1/2000 Gilbert et al.
(Continued)

FOREIGN PATENT DOCUMENTS

| CN | 102545984 A | 7/2012 |
| EP | 2 391 031 A1 | 11/2011 |

(Continued)

OTHER PUBLICATIONS

"A Multi-user Precoding Scheme achieving Crosstalk Cancellation with Application to DSL Systems" by G. Ginis and J. M. Cioffi, published in the Thirty-Fourth Asilomar Conference on Signals, Systems and Computers, held on Oct. 29, 2000-Nov. 1, 2000 (5 Pages).

(Continued)

*Primary Examiner* — Dmitry H Levitan
(74) *Attorney, Agent, or Firm* — Brown Rudnick LLP

(57) ABSTRACT

A transmission scheme for at least one transceiver pair, each transceiver pair including a first transceiver and a second transceiver, each transceiver including a transmitter and a receiver, the at least one transceiver pair defining a downlink between the transmitter of a first transceiver and the receiver of a second transceiver and further defining an uplink between the transmitter of the second transceiver and the receiver of the first transceiver, each transceiver pair transmitting data over a data transmission frame, the transmission scheme including determining a respective active-set for each one of the at least one transceiver pairs, the active-set including a combination of selected logical allocation units, each the logical allocation unit being defined as a unique combination of a time-slot and a frequency band, each selected logical allocation unit relates to at least one of the downlink only and the uplink.

8 Claims, 15 Drawing Sheets

US 10,057,024 B2
Page 2

Related U.S. Application Data

(60) Provisional application No. 61/805,844, filed on Mar. 27, 2013, provisional application No. 61/693,880, filed on Aug. 28, 2012, provisional application No. 61/672,307, filed on Jul. 17, 2012, provisional application No. 61/617,110, filed on Mar. 29, 2012.

(51) Int. Cl.
*H04W 72/04* (2009.01)
*H04B 1/38* (2015.01)
*H04L 5/14* (2006.01)
*H04W 52/02* (2009.01)
*H04L 1/20* (2006.01)
*H04B 3/32* (2006.01)

(52) U.S. Cl.
CPC .......... *H04L 5/0037* (2013.01); *H04L 5/1438* (2013.01); *H04L 5/1469* (2013.01); *H04L 5/1492* (2013.01); *H04W 52/0251* (2013.01); *H04W 72/0406* (2013.01); *H04B 3/32* (2013.01); *H04L 1/20* (2013.01); *H04L 5/0007* (2013.01); *H04L 5/0087* (2013.01); *H04W 72/04* (2013.01); *Y02D 70/00* (2018.01)

(58) Field of Classification Search
USPC ............... 370/310, 345, 431, 433, 442, 458
See application file for complete search history.

(56) References Cited

U.S. PATENT DOCUMENTS

| | | | |
|---|---|---|---|
| 6,055,297 A | 4/2000 | Terry | |
| 7,158,489 B1 | 1/2007 | Knuutila et al. | |
| 7,352,802 B2 | 4/2008 | Davis et al. | |
| 7,580,387 B2 * | 8/2009 | Kayama ............ | H04W 72/0446 370/329 |
| 8,156,359 B1 | 4/2012 | Sedarat et al. | |
| 8,675,574 B2 | 3/2014 | Tanigawa et al. | |
| 8,942,122 B2 | 1/2015 | He et al. | |
| 2004/0198218 A1 | 10/2004 | Linsky et al. | |
| 2006/0088007 A1 | 4/2006 | Jalali et al. | |
| 2008/0279143 A1 | 11/2008 | Lee et al. | |
| 2009/0129304 A1 | 5/2009 | Kim et al. | |
| 2009/0175156 A1 | 7/2009 | Xu | |
| 2009/0303949 A1 | 12/2009 | Tanigawa et al. | |
| 2010/0329386 A1 | 12/2010 | De Lind Van Wijngaarden | |
| 2011/0211503 A1 | 9/2011 | Che et al. | |
| 2013/0017851 A1 | 1/2013 | Kim | |
| 2013/0028151 A1 | 1/2013 | Ning et al. | |
| 2013/0272177 A1 | 10/2013 | Wei et al. | |
| 2014/0050227 A1 | 2/2014 | Goodson et al. | |
| 2015/0103702 A1 | 4/2015 | Lahetkangas et al. | |

FOREIGN PATENT DOCUMENTS

| | | |
|---|---|---|
| JP | H09321681 A | 12/1997 |
| JP | 2001-523931 A | 11/2001 |
| JP | 2008079156 A | 4/2008 |
| JP | 2008079270 A | 4/2008 |
| JP | 2011-504669 A | 2/2011 |
| JP | 2011511551 A | 4/2011 |
| WO | 9926430 A1 | 5/1999 |
| WO | 2010079951 A2 | 7/2010 |
| WO | 2011/140373 | 11/2011 |
| WO | 2012027924 A1 | 3/2012 |
| WO | 2012/051157 A1 | 4/2012 |

OTHER PUBLICATIONS

"A Near-Optimal Linear Crosstalk Precoder for Downstream VDSL", by R. Cendrillon et al., published in IEEE Transactions on Communications, vol. 55, No. 5, May 2007 (4 Pages).
Extended European Search Report dated Mar. 31, 2016 for European Application No. 13767721.7 (19 Pages).
International Search Report and Written Opinion of the International Searching Authority dated Jan. 30, 2014, for International Application No. PCT/IL2013/050810 (13 pages).
International Search Report and Written Opinion of the International Searching Authority dated Sep. 1, 2013 for International Application No. PCT/IB2013/052499 (21 Pages).
Notice of Reasons for Rejection dated Jul. 5, 2016 for Japanese Patent Application No. 2015-502536 (6 Pages).
Non Final Office Action dated Dec. 14, 2015 for U.S. Appl. No. 14/387,913 (10 Pages).
Response to Non Final Office Action Filed on Mar. 14, 2016 for U.S. Appl. No. 14/387,913 (11 Pages).
Non Final Office Action dated Mar. 23, 2016 for U.S. Appl. No. 14/387,913 (9 Pages).
Response to Non Final Office Action Filed on Jun. 22, 2016 for U.S. Appl. No. 14/387,913 (9 Pages).

\* cited by examiner

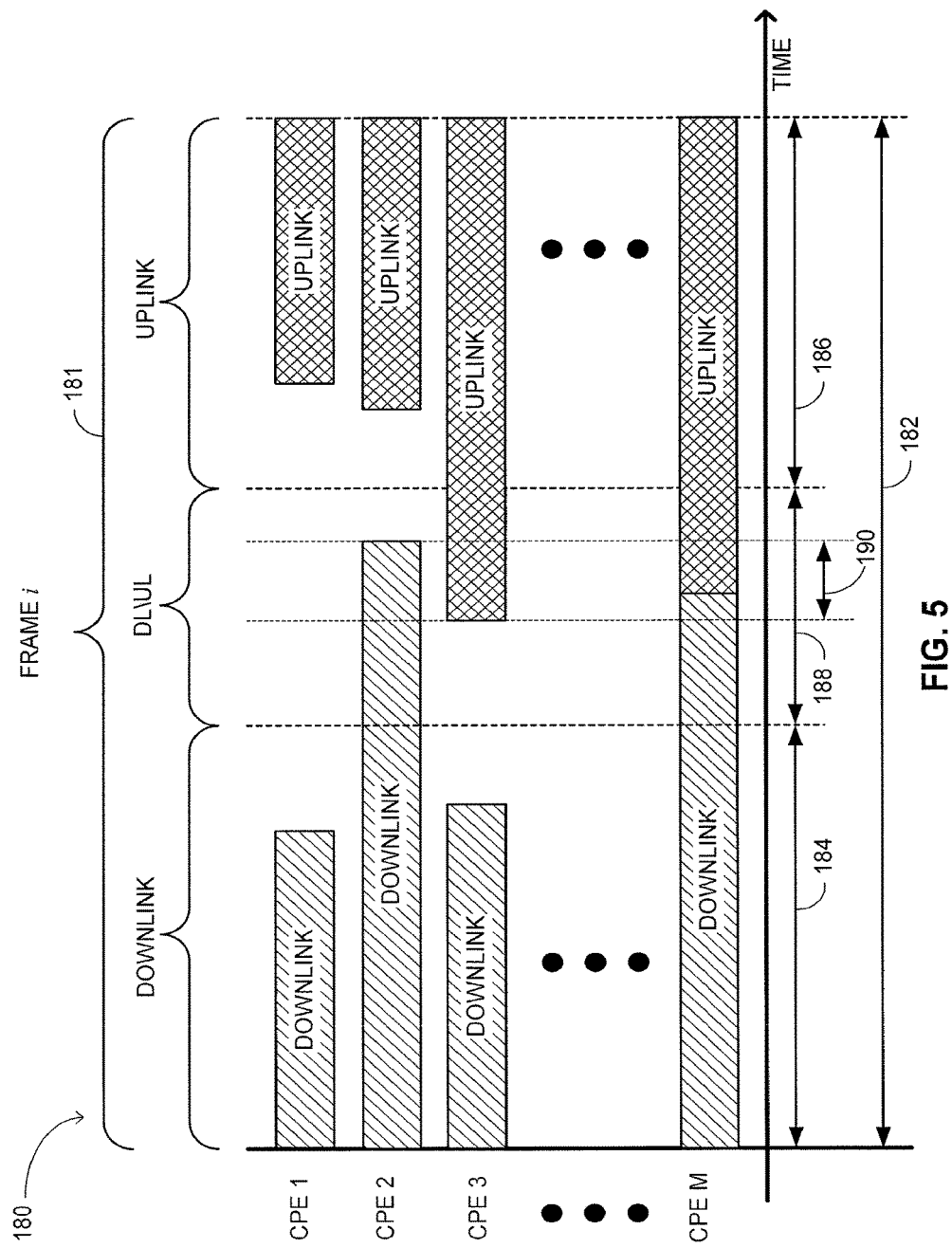

TRANSMISSION SCHEME FOR COMMUNICATION SYSTEMS

CROSS-REFERENCE TO RELATED APPLICATIONS

This claims priority to and is a continuation of U.S. patent application Ser. No. 14/387,913 filed Sep. 25, 2014. U.S. patent application Ser. No. 14/387,913 claims priority to and is a US national stage filing of international patent application number PCT/IB2013/052499 filed Mar. 28, 2013. International patent application number PCT/IB2013/052499 claims priority to and the benefit of each of the following four provisional US patent applications: U.S. patent application Ser. No. 61/617,110 filed Mar. 29, 2012; U.S. patent application Ser. No. 61/672,307 filed Jul. 17, 2012; U.S. patent application Ser. No. 61/693,880 filed Aug. 28, 2012; and U.S. patent application Ser. No. 61/805,844 filed Mar. 27, 2013. The entirety of each of these identified applications is incorporated herein by reference.

FIELD OF THE DISCLOSED TECHNIQUE

The disclosed technique relates to communications, in general, and to a framing scheme for a communication network, in particular.

BACKGROUND OF THE DISCLOSED TECHNIQUE

The "last mile" is a phrase in telecommunications, cable television and internet industries relating to the connection of retail customers (e.g., homes or offices) to the pertinent network (e.g., the telephone network or the internet). The "last mile" connections typically exhibit a bandwidth "bottleneck" limiting the rate of data delivery to the customers. Furthermore, "last mile" connections are expensive to upgrade due to the large number of such connections (i.e., relative to the number of connections between exchanges or routers).

Reference is now made to FIG. 1, which is a schematic illustration of a typical "last mile" connection which is known in the art. Such a typical "last mile" connection includes a building 10 a distribution point 20 and a central office 24. Building 10 includes, for example, eight apartments $12_1$-$12_8$. Each of apartments $12_1$-$12_8$ includes, for example, a respective one of computers $14_1$-$14_8$ coupled with a respective one of modems $16_1$-$16_8$ either directly or via a router or hub (not shown). Each one of modems $16_1$-$16_8$ is coupled with distribution point 20 via a respective one of line connections $18_1$-$18_8$ also known as "drops". Each one of line connections $18_1$-$18_8$ is, for example, a twisted pair of wires. Each one of line connections $18_1$-$18_8$ may further be, for example, a coaxial cable. Line connections $18_1$-$18_8$ are grouped together within a binder 22. Distribution point 20 along with line connections $18_1$-$18_8$ and computers $14_1$-$14_8$ constitute a communication system. Distribution point 20 is coupled with Central office 24 via a communication channel 26 (e.g., optical cable, wireless channel). The distance between building 10 and distribution point 20 is up to the order of hundreds of meters and typically up to 200 meters. The distance between distribution point 20 and central office 24 is up to the order of several kilometers.

It is noted that computers $14_1$-$14_8$ are brought herein as an example only. Other devices require communication services (e.g., smart TV's, smartphones, IP phones, routers) may be coupled with the respective one of modems $16_1$-$16_8$. Furthermore, building 10 may include offices rather than apartments. Additionally, the number of apartments or offices in building 10 may be different than eight (e.g. four, sixteen). Additionally, the distribution point may be connected to a plurality of private homes.

"G.fast" technology attempts to increase the data rate between the distribution point and the Customer Premise Equipment (CPE—such as modems, routers, hubs, computers, Smart TV's and the like) to the order of one Giga bits per second (i.e., 1 Gbps). Typically, the bandwidth of each twisted pair is between 100-200 Megahertz (MHz) and the number of twisted pairs per binder is between eight and sixteen. As a result of the high frequencies employed, a high degree of crosstalk interference exists between the different twisted pairs in the binder. In essence, due to the high level of crosstalk, the coupling between the distribution point and different CPE may be considered as a multiple access problem where a plurality of devices are coupled with the plurality of CPE's. Such a coupling or channel may be described in a matrix form where the entries in the matrix represent the different coupling factors.

Data transmission includes downstream transmission of data from the DP toward the CPE also referred to as downlink (DL). Data transmission also includes upstream transmission of data from the CPE toward the DP also referred to as uplink (UL). Furthermore, data transmission is divided into data frames, where each frame includes a plurality of time-slots each for transmitting a data symbols (i.e., a combination of bits is transmitted in each time-slot). Nevertheless, the terms 'time-slot' and 'symbol' are used herein interchangeably. In each frame, a portion of the symbols may be designated for downlink transmission and a portion of the symbols may be designated for uplink transmission. Frames may further be grouped in super-frames, where each super-frame includes a plurality (e.g., one the order of tens) of frames. Reference is now made to FIG. 2 which is a schematic of a super-frame, generally referenced 50, which is known in the art. Super-frame 50 includes a plurality of frames. The duration of super-frame 50 may in on the order of several milliseconds (ms) and typically 1 ms and each super-frame includes between 20 symbols and 40 symbols. Each frame, for example, frame 52, which corresponds to the second frame of super-frame 50, includes a plurality of time-slots, such as time-slot 54 for transmission of data symbols U.S. Patent Application Publication 2011/0211503 to Che et al, entitled "Dynamic Allocation of Subframe Scheduling for Time Division Duplex Operation in a Packet-Based Wireless communication System" directs to a system and a method for dynamically allocating subframe of a communication frame for downlink transmission of for uplink transmission. In the system and method directed to by Che et al, radio frame defined as having a duration of 10 milliseconds. The radio frame is further subdivided into 10 subframes, each having a duration of 1 millisecond. Each subframe is further divided again into two slots, each having a duration of 0.5 milliseconds as shown. The frame further has three special fields to form a 1 millisecond special subframe. These special fields are the downlink pilot time slot, the guard period and the uplink pilot time slot. The other sub-frames may be allocated to either downlink transmission or uplink transmission according to certain rules. According to the system and method directed to by Che, there are seven TDD configurations of downlink and uplink subframe allocation patterns to be used. One of the configuration patterns, which would be chosen by a radio resource controller RRC and communicated to the User Equipment (UE) the base station, so the pattern selected is known to both the UE the base station. According to Che et al, a portion of the subframes are protected subframes allocated for only downlink or uplink transmission while the other portion of the subframes are flexible subframes which may be allocated to either downlink or to uplink transmission. The subframes are allocated according to one of two approaches for dynamic allocation. In the first approach, the subframe allocation is embedded in the flexible subframes when these are downlink subframes. According to the second approach, the allocation is made in the protected subframes.

U.S. Pat. No. 6,016,311 to Gilbert et al entitled "Adaptive Time Division Duplexing and Apparatus for Dynamic Bandwidth Allocation Within a Wireless Communication System" directs to an adaptive time division duplexing where the uplink and downlink bandwidth requirements are continuously monitored. Accordingly, the time slots of each frame are allocated for either uplink transmission or downlink transmission. According to one allocation process, a frame, which includes N consecutive time slots The First $N_1$ time slots are dynamically configures for downlink transmissions only. The remaining slots are dynamically configured for uplink transmissions only. According to another allocation process, a frame, a plurality of adjacent time slots may interchangeably be allocated for downlink and uplink transmission.

SUMMARY OF THE PRESENT DISCLOSED TECHNIQUE

It is an object of the disclosed technique to provide a novel transmission scheme method and system. In accordance with the disclosed technique, there is thus provided a transmission scheme for at least one transceiver pair. Each transceiver pair includes a first transceiver and a second transceiver. Each transceiver includes a transmitter and a receiver. The at least one transceiver pair defines a downlink between the transmitter of a first transceiver and the receiver of a second transceiver and further defines an uplink between the transmitter of the second transceiver and the receiver of the first transceiver. Each transceiver pair transmits data over a data transmission frame. The transmission scheme includes determining a respective active-set for each one of the at least one transceiver pairs. The active-set includes a combination of selected logical allocation units. Each logical allocation unit is defined as a unique combination of a time-slot and a frequency band. Each selected logical allocation unit relates to at least one of the downlink only and the uplink.

In accordance with another embodiment of the disclosed technique, there is thus provided a communications system including a distribution point and at least one customer premise equipment. The distribution point includes at least one distribution point transceiver, a dynamic bandwidth allocator and a distribution point controller. The at least one distribution point transceiver includes a respective distribution point transmitter and a respective distribution point receiver. The customer premise equipment includes a customer premise equipment transceiver and a customer premise equipment controller. The customer premise equipment transceiver includes a customer premise equipment transmitter and a customer premise equipment receiver. The dynamic bandwidth allocator is coupled with the at least one distribution point transceiver. The distribution point controller is coupled with the at least one distribution point transceiver and with the dynamic bandwidth allocator. The customer premise equipment controller is coupled with the customer premise equipment transceiver. The distribution point transmitter transmits data over a data communication frame. The dynamic bandwidth allocator dynamically determines a transmission scheme. The distribution point controller provides the distribution point transceivers and the dynamic bandwidth allocator with extrinsic parameters relating thereto. The extrinsic parameters at least include the guaranteed bit rate specified for each user. The customer premise equipment transmitter transmitting data over the data communication frame. The a customer premise equipment controller provides customer premise equipment transceivers with extrinsic parameters relating to the operation thereof, the extrinsic parameters at least include the guaranteed uplink data rate associated with the respective customer premise equipment. The transmitter of the distribution point transceiver and the receiver of the customer premise equipment transceiver define the downlink. The transmitter of the customer premise equipment transceiver and the receiver of the distribution point transceiver define the uplink.

In accordance with a further embodiment of the disclosed technique, there is thus provided a method for determining a transmission scheme between at least one transceiver pair. Each transceiver pair includes a first transceiver and a second transceiver. Each transceiver includes a transmitter and a receiver. The at least one transceiver pair defines a downlink between the transmitter of a first transceiver and the receiver of a second transceiver and further defines an uplink between the transmitter of the second transceiver and the receiver of the first transceiver. Each transceiver pair transmits data over a data transmission frame. The data communication frame includes a plurality of time-slots for transmitting data symbols. The method includes the procedures of determining the combined available bandwidth for both downlink and uplink transmission, determining the required amount of data to be downlink transmitted and receiving uplink transmission requests from each one of the at least one second transceiver. The method further includes the procedure of determining bandwidth allocation parameters for each of the at least one second transceivers, retrieving previously allocated downlink and uplink transmission opportunities and determining a transmission scheme to be used by the at least one first transceiver and by the at least one second transceiver, at least for the next transmission frame.

In accordance with another embodiment of the disclosed technique, there is thus provided a scheme between at least one transceiver pair. Each transceiver pair includes a first transceiver and a second transceiver. Each transceiver includes a transmitter and a receiver. The at least one transceiver pair defines a downlink between the transmitter of a first transceiver and the receiver of a second transceiver and further defines an uplink between the transmitter of the second transceiver and the receiver of the first transceiver. Each transceiver pair transmits data over a data transmission frame. The data communication frame includes a plurality of time-slots for transmitting data symbols. The transmission scheme includes partitioning the frame in time into three mutually exclusive time zones. The time zones include an downlink zone, followed by a downlink\uplink zone, followed by a uplink zone. The downlink zone is for downlink transmission by the transmitter of the first transceiver. The uplink zone is for uplink transmission by the transmitter of the second transceiver. The downlink\uplink zone is for at least one of downlink transmission by the transmitter of the first transceiver and uplink transmission by the transmitter of the second transceiver.

In accordance with a further embodiment of the disclosed technique, there is thus provided a probing signal scheme between at least one transceiver pair. Each transceiver pair includes a first transceiver and a second transceiver. Each transceiver includes a transmitter and a receiver. The at least one transceiver pair define a downlink between the transmitter of a first transceiver and the receiver of a second transceiver and further define an uplink between the transmitter of the second transceiver and the receiver of the first transceiver. Each transceiver pair transmits data over a data transmission frame. The data transmission frame includes a plurality of time-slots for transmitting data symbols. The probing signal scheme includes assigning a respective probing signal for each channel. Each respective probing signal being cyclically shifted version of a reference probing signal shifted by a respective cyclic shift. The number of cyclic shifts being no greater than the duration of the time-slot in the data transmission frame divided by the number of the transceiver pairs,

BRIEF DESCRIPTION OF THE DRAWINGS

The disclosed technique will be understood and appreciated more fully from the following detailed description taken in conjunction with the drawings in which:

FIG. 5 is a schematic illustration of a transmission scheme between a pair of transceivers, in accordance with a further embodiment of the disclosed technique;

DETAILED DESCRIPTION OF THE EMBODIMENTS

The disclosed technique overcomes the disadvantages of the prior art by providing a method and a system for dynamically determining a data transmission scheme. According to one transmission scheme communication frames are partitioned to downlink and uplink periods in a communication system. Accordingly, each frame is divided into a respective downlink period and a respective uplink period. The duration of the downlink period and of the uplink period may change for each frame, or determined for all the frames in a super-frame. Alternatively, According to another transmission scheme, each frame is divided into three periods, downlink only transmission period, uplink only transmission period and a third period used for either downlink or uplink transmissions. This third period typically corresponds to unused or non-allocated symbols in a frame. These symbols are available for either downlink or uplink transmission, without the need for special allocation for use in case an unexpected burst of data is to be transmitted in the downlink or the uplink. The uplink only transmission period is synchronized with the downlink only transmission period to alleviate crosstalk between these transmissions.

According to yet another transmission scheme according to the disclosed technique, the transmission bandwidth of each symbol in a frame is further divided into a plurality of sub-bands. The time duration of a symbol (i.e., a time-slot) in a frame, along with a sub-band, define a Logical Allocation Unit (LAU). Thus, each frame may be regarded as a two dimensional array of LAUs. Each user is allocated respective set of LAUs that may be used for transmission (i.e., downlink transmission and uplink transmission). This set of LAUs defines an 'active-set' used for transmission. An active-set is determined for each frame or for each superframe. In other words, the active-set may either change or not change for each frame or super-frame. Assigning an active-set of LAUs, facilitates an additional degree of freedom allowing implementation of power management and duplexing schemes.

In the description below, reference is made to a distribution point communicating with a plurality of CPE's over a twisted pair of wire. However, it is noted that the disclosed technique refers to any type of communication system, for example, a router (i.e., wired or wireless) communicating with a plurality of computer devices. Furthermore, the term "transmission opportunity" herein refers to either a time-slot or an LAU in an active-set. Furthermore, the term "transmission scheme" refers herein to the allocation of transmission opportunities (i.e., either downlink or uplink) to the DP and the CPEs. However, it is noted that the DP or the CPEs need not necessarily use all the allocated transmission opportunities thereto.

Figure 1:
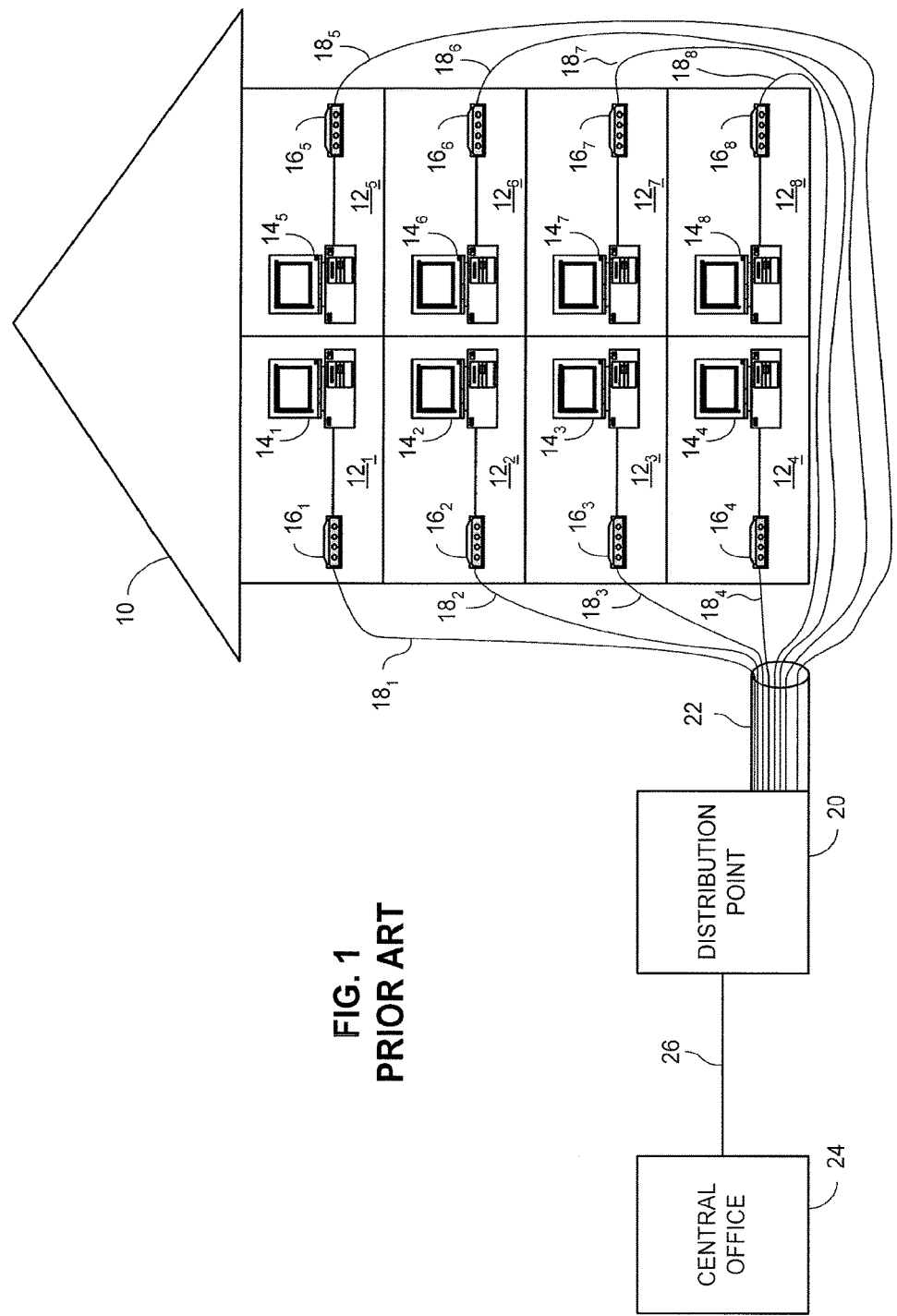
FIG. 1 is a schematic illustration of a typical "last mile" connection which is known in the art.
Figure 2:
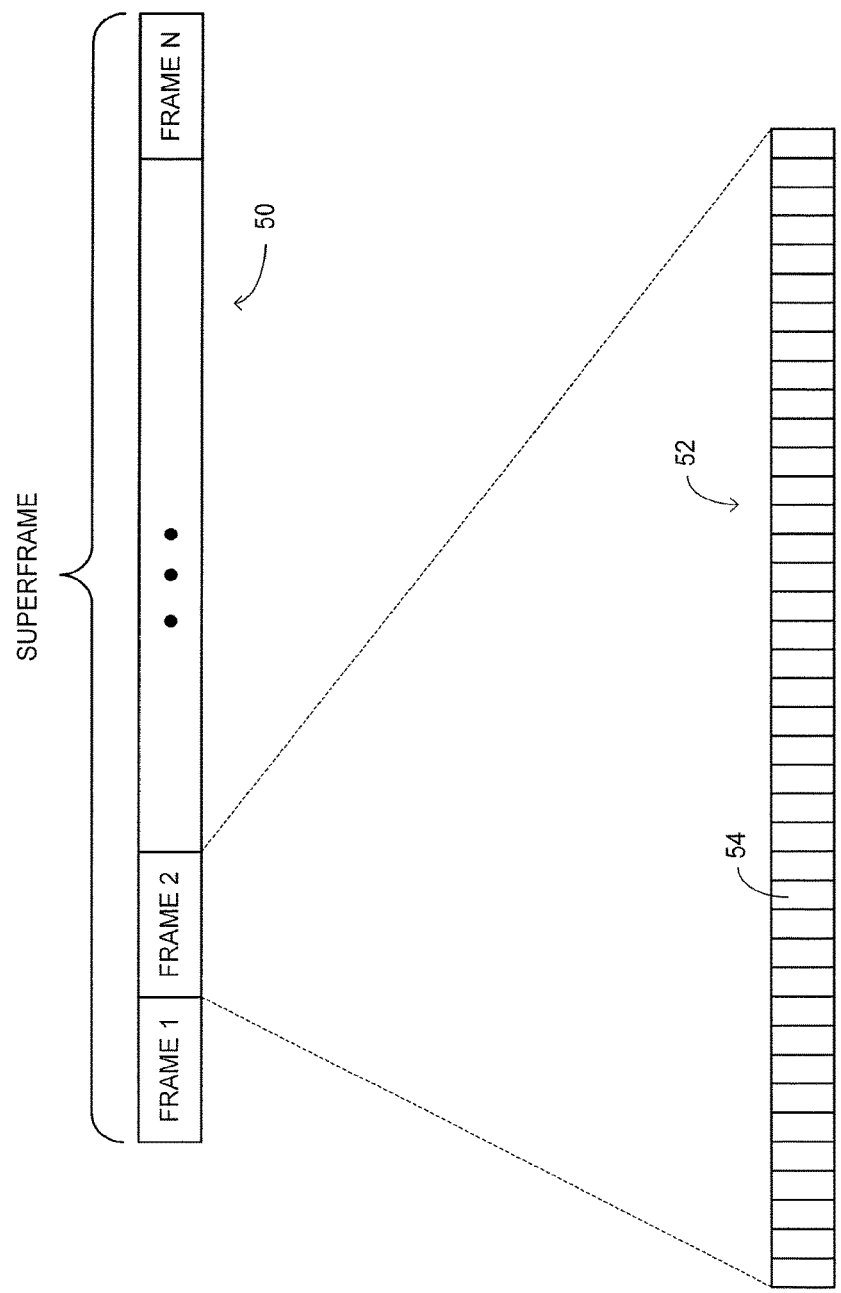
FIG. 2 is a schematic of a super-frame which is known in the art.
Figure 3:
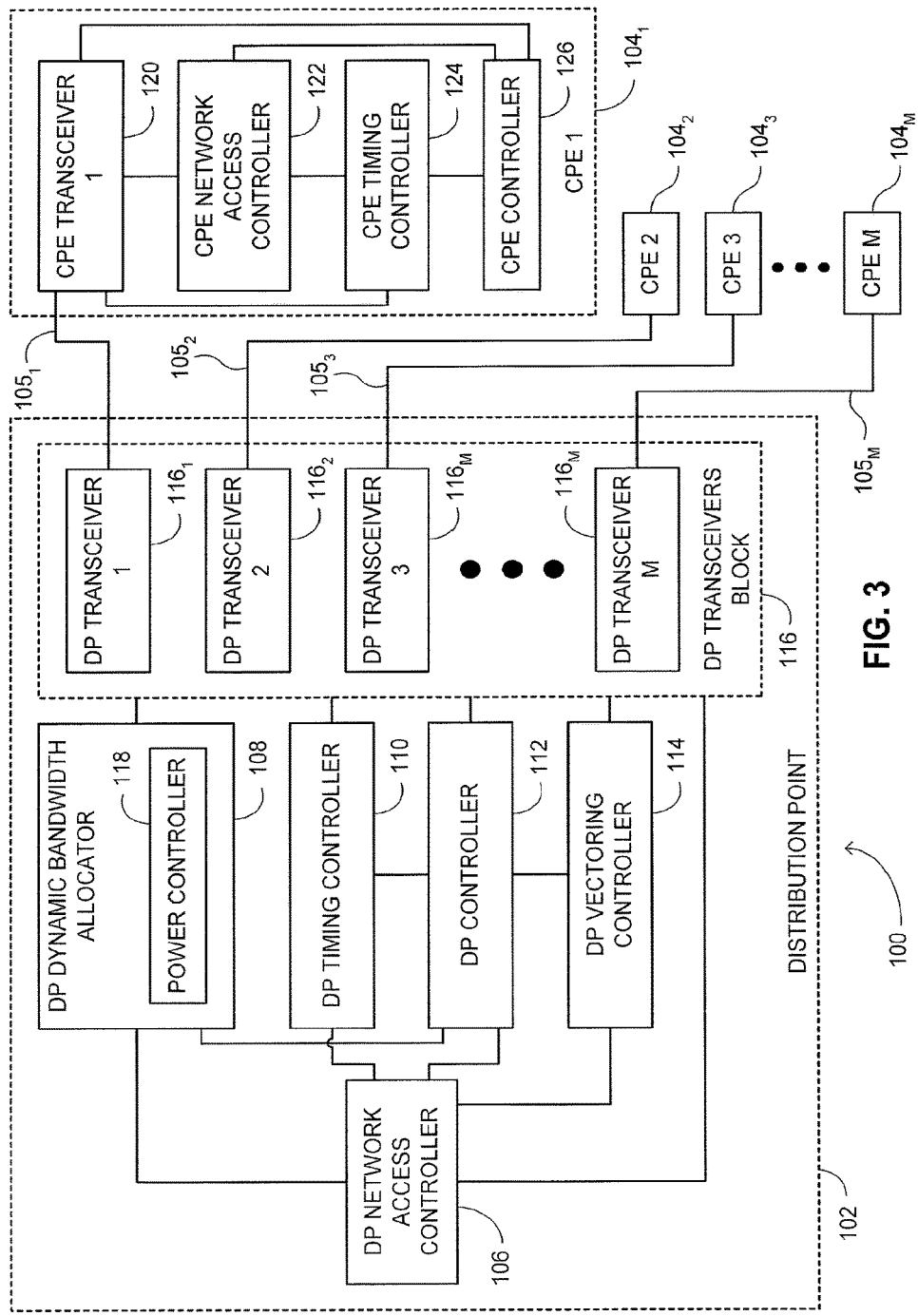
FIG. 3 is a schematic illustration of a communication system constructed and operative in accordance with an embodiment of the disclosed technique.

Reference is now made to FIG. 3 which is a schematic illustration of a communication system, generally referenced 100, constructed and operative in accordance with an embodiment of the disclosed technique. System 100 includes a distribution point (DP) 102 and a plurality of Customer Premise Equipment (CPEs) $104_1$, $104_2$, $104_3$, ..., $104_m$. DP 102 includes a DP network access controller 106, a DP dynamic bandwidth allocator 108, a DP timing controller 110, a DP controller 112, a DP vectoring controller 110 and a DP transceivers block 116. DP transceivers block 116 includes a plurality of DP transceivers $116_1$, $116_2$, $116_3$, ..., $116_m$. DP dynamic bandwidth allocator 108 includes a power controller 118. Each one or CPEs $104_1$, $104_2$, $104_3$, ..., $104_m$, such as CPE $104_1$ includes a respective CPE transceiver 120, a respective CPE network access controller 122, a respective CPE timing controller 124 and a respective CPE controller. Each one of DP transceivers $116_1$, $116_2$, $116_3$, ..., $116_m$ and the CPE transceiver 120 of a respective one of CPEs $104_1$, $104_2$, $104_3$, . . . , $104_m$ includes a transmitter (not shown) and a receiver (also not shown).

Each one of DP transceivers $116_1$, $116_2$, $116_3$, . . . , $116_m$ is coupled with a respective CPE transceiver 120 of a respective one of one of CPEs $104_1$, $104_2$, $104_3$, . . . , $104_m$ defining transceiver pairs. The transmitters of DP transceivers $116_1$, $116_2$, $116_3$, . . . , $116_m$ and the respective receivers of each CPE transceiver 120 of a respective one of CPEs $104_1$, $104_2$, $104_3$, . . . , $104_m$ coupled therewith, define a downlink. Furthermore, the receivers of DP transceivers $116_1$, $116_2$, $116_3$, . . . , $116_m$ and the respective transmitters of each CPE transceiver 120 of a respective one of CPEs $104_1$, $104_2$, $104_3$, . . . , $104_m$ coupled therewith, define an uplink. Accordingly, each one of DP transceivers $116_1$, $116_2$, $116_3$, . . . , $116_m$ forms a respective link over a respective channel $105_1$, $105_2$, $105_3$, . . . , $105_m$ with a respective CPE transceiver 120 of a respective one of one of CPEs $104_1$, $104_2$, $104_3$, . . . , $104_m$. The term 'link' relates herein to two devices communicating with each other (i.e., transmitting data to each other and receiving data from each other).

DP Controller 112 is coupled with DP network access controller 104, DP dynamic bandwidth allocator 108, DP timing controller 110, DP vectoring controller 114 and with each one of transceivers $116_1$, $116_2$, $116_3$, . . . , $116_m$. DP Dynamic bandwidth allocator 108 is further coupled with network access controller 106 and with each one of transceivers $116_1$, $116_2$, $116_3$, . . . , $116_m$. DP Timing controller 110 is further coupled with network access controller 106 and with each one of transceivers $116_1$, $116_2$, $116_3$, . . . , $116_m$. DP Vectoring controller 114 is further coupled with network access controller 106 and with each one of transceivers $116_1$, $116_2$, $116_3$, . . . , $116_m$. Network access controller 106 is further coupled with a network (e.g., POTS or Internet not shown)

CPE controller 124 is coupled with CPE transceiver 120, CPE network access controller 122 and with CPE timing controller 124. CPE timing controller 124 is further coupled with CPE network access controller 122 and with CPE transceiver 120. CPE network access controller is further coupled with CPE transceiver 120 and with a customer premise network (not shown)

DP Controller 112 provides DP network access controller 106, DP dynamic bandwidth allocator 108, DP timing controller 110, DP vectoring controller 114 and each one of DP transceivers $116_1$, $116_2$, $116_3$, . . . , $116_m$ with extrinsic parameters relating to the operation of DP 102. DP Controller 112 may receive updates relating to these extrinsic parameters either from the network via network access controller 106 or via a use interface (not shown). The term 'extrinsic parameters' relates herein to parameters which are not determined by DP 102. For example, DP controller 112 provides dynamic bandwidth allocator 108 with the maximum data rate or the guaranteed data rate specified in the contract of each user associated with CPEs $116_1$, $116_2$, $116_3$, . . . , $116_m$. Dynamic bandwidth allocator 108 may use this information when determining the allocated transmission opportunities for each one of CPEs $116_1$, $116_2$, $116_3$, . . . , $116_m$. DP controller 112 may also provide dynamic bandwidth allocator 108 with required operating temperatures of DP 102 or of the components thereof or with ambient temperature threshold and component temperature thresholds, to allow power controller 118 to determine the required power dissipation of each one of transceivers $116_1$, $116_2$, $116_3$, . . . , $116_m$ so as to maintain the temperature below a determined temperature threshold.

DP Dynamic bandwidth allocator 108, dynamically determines transmission schemes for DP 102 and each one of CPEs $104_1$, $104_2$, $104_3$, . . . , $104_m$. These transmission schemes define the downstream transmission opportunities of each one of DP transceivers $116_1$, $116_2$, $116_3$, . . . , $116_m$ and the upstream transmission opportunities for each one of CPE transceivers 120 respective of CPEs $104_1$, $104_2$, $104_3$, . . . , $104_m$. As mentioned above, these transmission opportunities may be time-slots in a frame or LAUs in an active-set. To that end, DP Dynamic bandwidth allocator 108 receives bandwidth reports. These bandwidth reports include information relating to the previously used transmission opportunities by DP 102 for the downlink and by each of CPEs $104_1$, $104_2$, $104_3$, . . . , $104_m$ for the uplink. These bandwidth reports may also include information relating to the required amount of data to be transmitted by DP 102 and by each of CPEs $104_1$, $104_2$, $104_3$, . . . , $104_m$. The information relating to the required amount of data to be transmitted may be based on data queue status reports of the various data streams for the various links in both the downlink and the uplink. To that end, each of CPEs $104_1$, $104_2$, $104_3$, . . . , $104_m$ may transmits the uplink data queues status thereof to DP 102 periodically or upon request from DP dynamic bandwidth allocator 108. The bandwidth reports may also include information relating to the minimum amount of data DP 102 and each of CPEs $104_1$, $104_2$, $104_3$, . . . , $104_m$ require to transmit (i.e., may be smaller or larger than the stored amount of data to be transmitted). The term 'amount of data' refers to herein the number of units of information (e.g., bits, bytes or symbols).

DP Dynamic bandwidth allocator 108 determines the downstream transmission opportunities at least according to the amount of data required to be transmitted to each of CPEs $104_1$, $104_2$, $104_3$, . . . , $104_m$. DP Dynamic bandwidth allocator 108 determines the upstream transmission opportunities for each one of CPE transceivers 120 at least according to the required amount of data to be transmitted by each one of CPEs $104_1$, $104_2$, $104_3$, . . . , $104_m$. DP Dynamic bandwidth allocator 108 may determine the downlink and uplink transmission opportunities further according to the other information included in the bandwidth reports and further according to service parameters such as guaranteed bit rate (e.g., according to the service contract of each CPE), quality of service, priority (e.g., when DP Dynamic bandwidth allocator 108 did not allocate transmission opportunities to a certain CPE that CPE shall receive priority over other CPEs) and maximum allowed bit rate. It is noted that since dynamic bandwidth allocator 108 allocates the transmission opportunities to CPEs $104_1$, $104_2$, $104_3$, . . . , $104_m$ (i.e., allocation of transmission opportunities is done at DP 102 and not per link), the total number of available transmission opportunities (i.e., either time slots or LAUs) for all the links may be viewed as a common resource of DP 102. The allocation of this common resource to the various links is the result of an optimization process based on the above mentioned input. It is further noted that the use of active active-sets facilitates control or management of the power consumption or temperature of DP 102 as further explained below.

Dynamic bandwidth allocator 108 receives information relating to the ambient temperature of DP 102 or of components (e.g., chips) within DP 102 from various sensors (not show) inside DP 102. Furthermore, dynamic bandwidth allocator 108 may receive additional information relating to the actual power consumption of DP 102 (e.g., from current and voltage sensors both not shown). Dynamic bandwidth allocator 108 may further receive information relating required operating temperatures of DP 102 or of the components thereof or with ambient temperature threshold and component temperature thresholds. Alternatively or additionally, Dynamic bandwidth allocator 108 may further receive information relating to the required energy or power dissipation of DP 102. Power controller 118 uses this information to control the power dissipation of each one of transceivers $116_1$, $116_2$, $116_3$, . . . , $116_m$ so as to meet either power dissipation requirements, temperature requirements or both. For example, these temperature requirements include maintaining the temperature of DP 102 below a determined temperature threshold (i.e., either the temperature within DP 102 or the temperature of components of DP 102). The power requirements may be, for example, a power dissipation threshold of DP 102.

DP timing controller 110 receives from DP network access controller 106 network timing information (e.g., SyncE or IEEE 1588 or both) and provides this network timing information to DP transceivers $116_1$, $116_2$, $116_3$, . . . , $116_m$. DP transceivers $116_1$, $116_2$, $116_3$, . . . , $116_m$ use this network timing information to coordinate the transmission and reception of data. The network timing information is, for example, the Time-of-Day and the network timing reference. DP transceivers $116_1$, $116_2$, $116_3$, . . . , $116_m$ align the super-frames and frames transmitted thereby the Time-of-Day and the network timing reference and may synchronize the respective transceiver clocks (not shown) to the Time-of-Day information, the network timing reference or both.

DP vectoring controller 114 receives backchannel information from network access controller 106 and determines the matrix coefficient (i.e., pre-coding matrix) of a pre-coder (not shown) of each one of DP transceivers $116_1$, $116_2$, $116_3$, . . . , $116_m$, to alleviate crosstalk interference. Backchannel information includes information received from each one of CPEs $104_1$ $104_2$, $104_3$, . . . , $104_m$, which relates to parameters of each one of channels $105_1$, $105_2$, $105_3$, . . . , $105_m$ respectively. These parameters relate, for example, to the downlink FEXT measurements. The parameters are determined by each one of CPEs $104_1$ $104_2$, $104_3$, . . . , $104_m$ according to probing signals transmitted by DP vectoring controller 114 via each one of transceivers $116_1$, $116_2$, $116_3$, . . . , $116_m$ to the respective one of CPEs $104_1$ $104_2$, $104_3$, . . . , $104_m$. DP vectoring controller 114 employs all of the parameters relating to channels $105_1$, $105_2$, $105_3$, . . . , $105_m$ to determine a channel response matrix.

DP Network access controller 106 provides each one of DP transceivers $116_1$, $116_2$, $116_3$, . . . , $116_m$ the respective downstream data destined to the respective one of CPEs $104_1$, $104_2$, $104_3$, . . . , $104_m$. Network access controller 106 further receives from each one of DP transceivers $116_1$, $116_2$, $116_3$, . . . , $116_m$ the upstream data from the respective one of CPEs $104_1$, $104_2$, $104_3$, . . . , $104_m$. DP Network access controller 106 may include buffers (not shown) for temporarily storing downstream and upstream data when the rate of the data received exceeds the rate of the transmitted data.

Each one of DP transceivers $116_1$, $116_2$, $116_3$, . . . , $116_m$ transmits data to CPE transceiver 120 of the respective one of CPEs $104_1$, $104_2$, $104_3$, . . . , $104_m$. When transmitting downstream data, each one of transceivers $116_1$, $116_2$, $116_3$, . . . , $116_m$ performs transmission operation such as modulation, pre-coding and Forward Error Correction (FEC) encoding. When receiving upstream data, each one of transceivers $116_1$, $116_2$, $116_3$, . . . , $116_m$ performs reception operations such as demodulation, filtering, FEC decoding.

All transceivers $116_1$, $116_2$, $116_3$, . . . , $116_m$ simultaneously transmit data frames starting at the same time and over the transmission frequency range.

CPE Controller 126 provides CPE network access controller 122, CPE timing controller 124, CPE transceivers 120 with extrinsic parameters relating to the operation of CPE 104. DP Controller 112 may receive updates relating to these extrinsic parameters either from the network via network access controller 106 or via a use interface (not shown). These extrinsic parameters are, for example, the guaranteed and maximum uplink data rate of the respective CPE.

CPE timing controller 124 receives from CPE transceiver 120 network timing information and provides this information to network access controller 122. CPE transceiver 120 uses this network timing information to coordinate the transmission and reception of data. As mentioned above, the network and frequency timing information is, for example, the Time-of-Day and the network timing reference. CPE transceiver 120 may synchronize the transceiver clock (not shown) to the Time-of-Day information, the network timing reference or both.

CPE Network access controller 122 receives from the user device or devices (e.g., computers, routers, smartphones all not shown) upstream data and provides this upstream data to transceiver 120. CPE Network access controller 122 receives from transceiver 120 downstream data and provides this downstream data to the user device or devices. CPE Network access controller 106 may include buffers (not shown) for temporarily storing downstream and upstream data when the rate of the data received exceeds the rate of the transmitted data (i.e., either toward the DP or the network).

When transmitting upstream data, transceiver 120 performs transmission operation such as modulation, pre-coding and FEC encoding. When receiving downstream data, transceiver 120 performs reception operations such as demodulation, filtering and FEC decoding.

Generally, system 100 employs Discrete Multi-Tone (DMT) transmission in which the transmission bandwidth is divided into a plurality of sub-channel. Each sub-channel is associated with a respective sub-carrier. Due to the non-uniform frequency response of the transmission bandwidth, each sub-channel is further associated with a respective modulation constellation such as 64 Quadrature Amplitude Modulation (QAM), 256 QAM and the like. The respective modulation constellation of each sub-channel is determined according to the frequency response of that sub-channel, required bit rate and power constraints. Furthermore, the respective modulation constellation of each sub-channel dynamically changes as the frequency response of the transmission bandwidth changes. In system 100, transceivers $116_1$, $116_2$, $116_3$, . . . , $116_M$ and transceiver 120 respective of each one of CPEs $104_1$, $104_2$, $104_3$, . . . , $104_m$ generally transmit and receive transmission over all the sub-channels.

As mentioned above with reference to FIG. 3, DP Dynamic bandwidth allocator 108, dynamically determines the downstream transmission opportunities of each one of DP transceivers $116_1$, $116_2$, $116_3$, . . . , $116_m$ and the upstream transmission opportunities for each one of CPE transceivers 120 respective of CPEs $104_1$, $104_2$, $104_3$, . . . , $104_m$. The following description in conjunction with FIGS. 4A, 4B, 5 and 6 relate to various embodiments according to which DP Dynamic bandwidth allocator 108 dynamically allocates the downstream and upstream transmission opportunities.

Figure 4A:
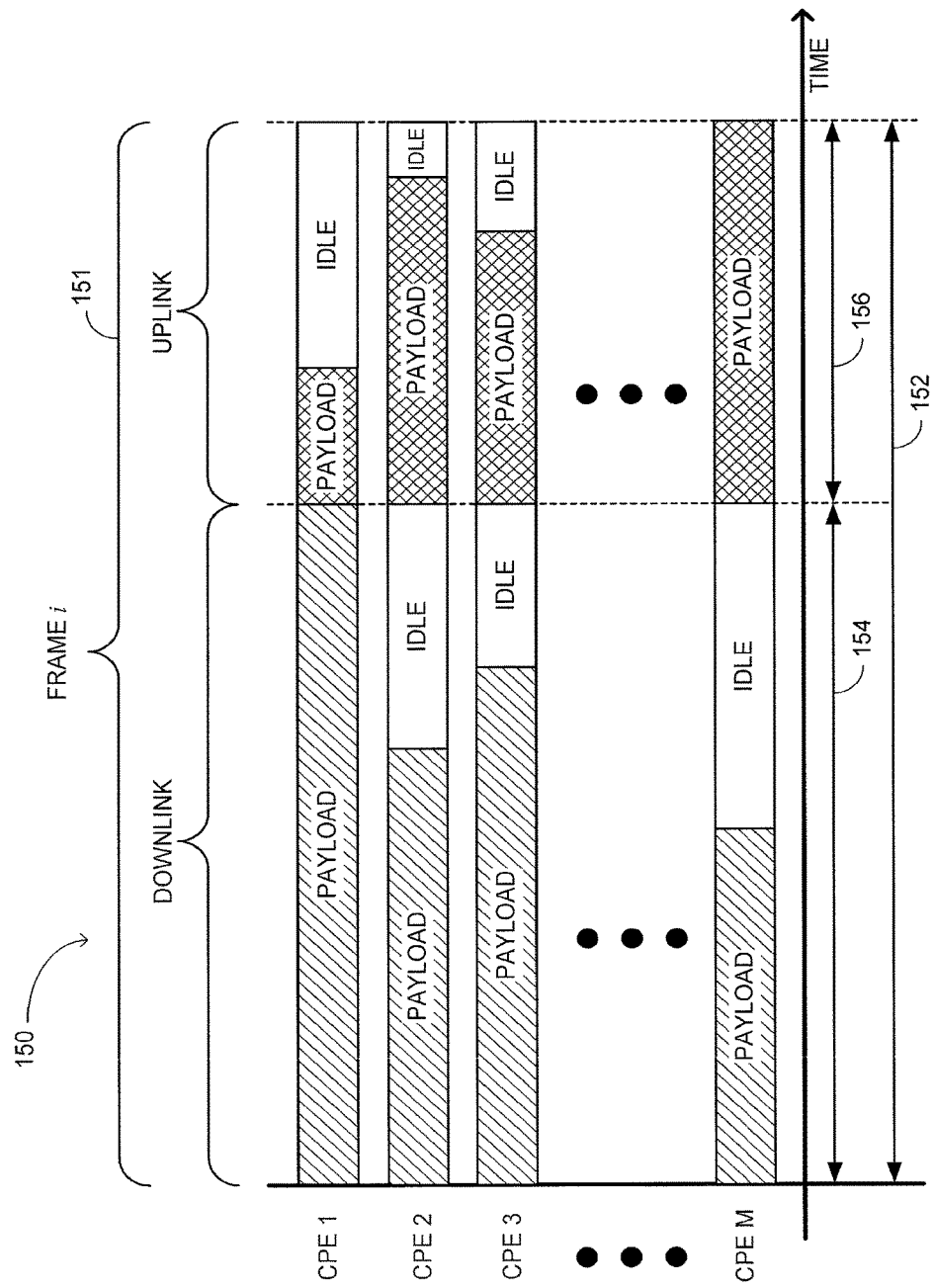
FIGS. 4A and 4B are schematic illustrations of two different transmission schemes in a communication system, in accordance with another embodiment of the disclosed technique.
Figure 4B:
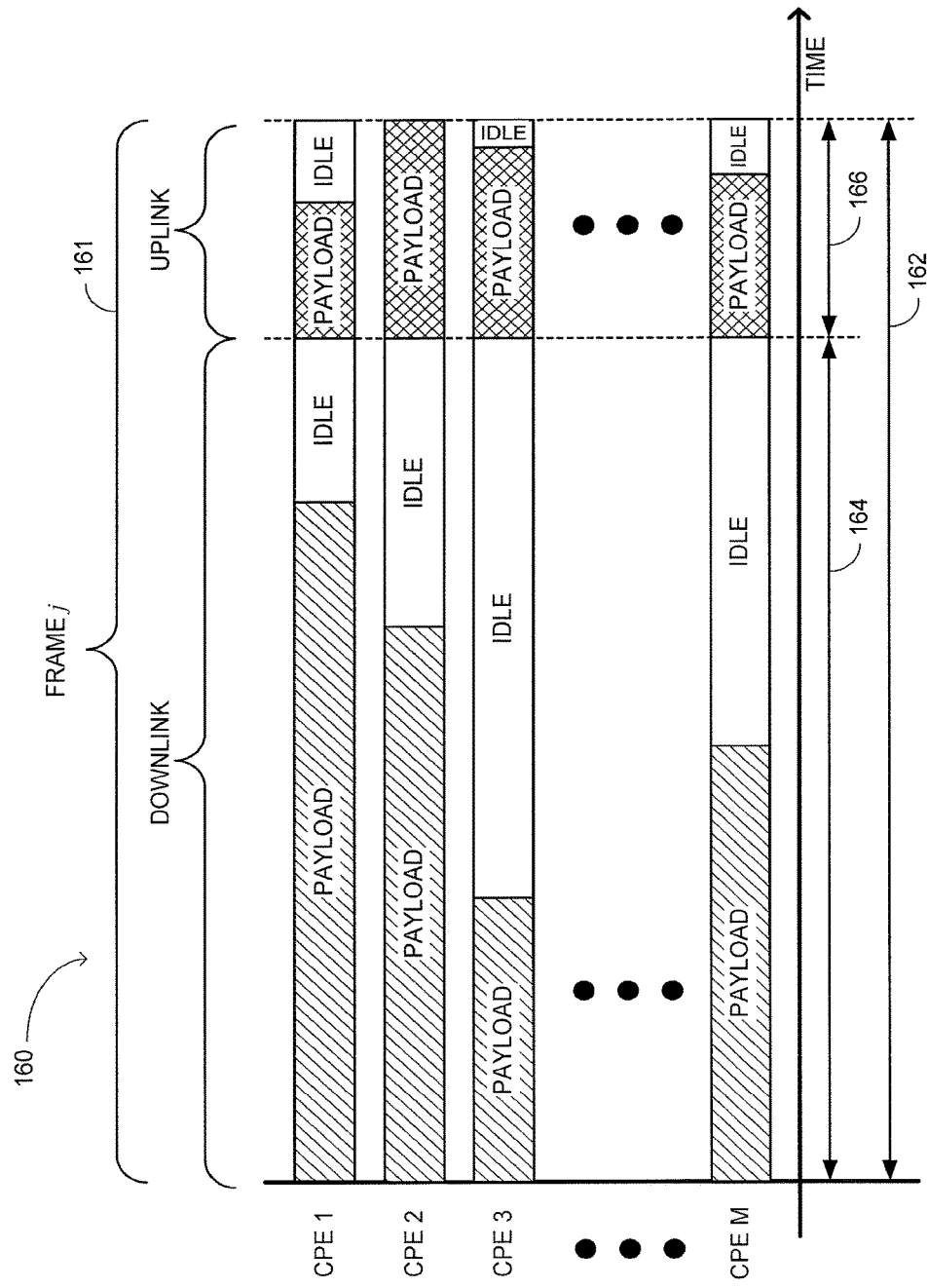

According to another embodiment of the disclosed technique, each frame is dynamically divided into a downlink transmission time-period and to an uplink transmission time-period. These transmission time-periods are also referred to herein as 'zones'. Reference is now made to FIGS. 4A and 4B, which are schematic illustrations of two different transmission schemes, generally referenced 150 and 160 respectively, in a communication system, in accordance with another embodiment of the disclosed technique. According to transmission schemes 150 and 160, each one of frames 151 and 161 is partitioned into a respective downlink time-period and a respective uplink time-period. In FIG. 4A, frame 151 represents the ith frame in a super-frame. Time-period 152 is the time duration of frame 151. Within time-period 152, time period 154 is designated for downlink transmission and time-period 156 is designated for uplink transmission. In frame 151, CPE 1 transmits during the entire downlink time-period 154. CPE 2, CPE 3 and CPE M transmit payload during respective portions of downlink time-period 154. During the remaining portions CPE 2, CPE 3 and CPE M transmit idle data, for example, used for crosstalk cancelation. CPE M transmits during the entire uplink time-period 156. CPE 1, CPE 2 and CPE 3 transmit payload data during respective portions of uplink time-period 156. During the remaining portions CPE 1, CPE 2 and CPE 3 transmit idle data.

In FIG. 4B, frame 161 represents the jth frame in the super-frame. Time-period 162 is the time duration of frame 161. Time period 162 is equal to time-period 152 (FIG. 4A). Within time-period 162, time period 164 is designated for downlink transmission and time-period 166 is designated for uplink transmission. Comparing frame 100 and frame 120, downlink time-period 164 (FIG. 4B) is longer than downlink time-period 154 (FIG. 4A). CPE 1, CPE 2, CPE 3 and CPE M transmit payload during respective portions of downlink time-period 164. During the remaining portions CPE 1, CPE 2, CPE 3 and CPE M transmit idle data. CPE 2 transmits payload during the entire uplink time-period 166. CPE 1, CPE 3 and CPE 4 transmit payload during respective portions of uplink time-period 166. During the remaining portions, CPE 1, CPE 3 and CPE 4 transmit idle data. Accordingly, uplink time-period 166 (FIG. 4B) is shorter than downlink time-period 156 (FIG. 3A). The downlink and uplink time-periods are allocated on a frame by frame basis or on a super-frame by super-frame basis.

According to a further embodiment of the disclosed technique, DP Dynamic bandwidth allocator 108 (FIG. 3) dynamically divides each frame into three time-periods (i.e., zones), a downlink transmission time-period, an uplink transmission time-period and a downlink\uplink transmission time-period. Reference is now made to FIG. 5, which is a schematic illustration of a transmission scheme, generally referenced 180, between a pair of transceivers, in accordance with a further embodiment of the disclosed technique. According to transmission scheme 180, frame 181, which is the ith frame in a super-frame, is partitioned into three mutually exclusive zones. Within time-period 182 of frame 181, time-period 184 is designated for downlink only transmission, time-period 186 is designated for uplink only transmission and time-period 188 is designated for either uplink or downlink (abbreviated DL\UL in FIG. 4) transmission. Each DP and CPE may use time-period 188 without special allocation. For example, the DP may use time period 188 for downlink transmission when the amount of data required to be sent to one of the CPEs exceeds the amount of data to be transmitted on the allocated downstream time period 184. Similarly, the CPE may use time period 188 for uplink transmission when the amount of data required to be sent to one of the DP exceeds the amount of data to be transmitted on the allocated downstream time period 186.

The partition of the frame to these three time-periods is synchronized across all the links. In other words, each of the frames respective of each of transceivers $116_1$, $116_2$, $116_3$, ..., $116_m$ exhibits the same portioning into three time-periods. Thus, the noise due to FEXT in the downlink only transmission time-period (i.e., zone) and the uplink only transmission time-period may be substantially low or controlled (e.g., with pre-coding or crosstalk cancellation). DP dynamic bandwidth allocator 108 dynamically configures the durations of each of the three time-periods according to the above mentioned bandwidth reports.

In frame 181, the downlink transmissions are aligned to the start of a frame, whereas uplink transmissions are aligned to the end of the frame. In other words, when DP dynamic bandwidth allocator 108 (FIG. 3) allocates the downlink transmission opportunities for each user, DP dynamic bandwidth allocator 108 starts allocating the transmission opportunities from the start of frame 180. When DP dynamic bandwidth allocator 108 allocates the uplink transmission opportunities for each user, DP dynamic bandwidth allocator 108 starts allocating the transmission opportunities from the end of frame 180.

In FIG. 5 CPE 1 exhibits a standard duration of uplink and downlink transmissions, CPE 2 exhibits a long duration of downlink transmission (i.e., relatively large amount of data is transmitted), CPE 3 exhibits a long duration of uplink transmission and CPE 4 exhibits a long duration of uplink transmission and a long duration of downlink transmission. The actual uplink and downlink transmission durations of each of the links may change from frame to frame. When the downlink transmission durations are confined to downlink only time-period 184 and the uplink transmission durations are confined to uplink only time-period 186, DP 102 and each one of CPEs $104_1$, $104_2$, $104_3$, ..., $104_m$ do not need to coordinate the transmissions thereof. However, when the downlink requirements and the uplink requirements supersede the respective allocated time-periods, concurrent downlink and uplink transmission such as occurs during time-period 190 where DP 102 transmits downlink to CPE 2 concurrently with the uplink transmission of CPE 3, should be avoided. The event of concurrent uplink and downlink transmissions increases the probability of error in the received messages (i.e., either by the DP of by the pertinent ORE) due to the cross talk which occurs in such cases. Hence, in general, there are two options. The first option is to accept the fact that some errors will occur in the event of concurrent downlink and uplink transmission, though such events are generally rare. The second option is manage the allocations of the transmission opportunities within the DL\UL zone, such that such concurrent transmission shall not occur. To that end, DP 102 and each one of CPEs $104_1$, $104_2$, $104_3$, ..., $104_m$ coordinate the transmissions thereof. For example, DP 102 and each one of CPEs $104_1$, $104_2$, $104_3$, ..., $104_m$ may coordinate the transmissions thereof according to the downlink transmission queue. For example, DP dynamic bandwidth allocator 108 limits the downlink transmission to not exceed the combined downlink and mixed DL\UL time-periods. Transceiver 120 of each one of CPEs $104_1$, $104_2$, $104_3$, ..., $104_m$ detects the end of transmission of DP 102 and CPE timing controller 124 plans the transmission thereof to not overlap with the downlink, while aligning the uplink transmission to the end of the frame. Thus, no overhead resulting from transmitting a coordination messages is required. However, the processing latency may impose substantial transition time-period between downlink transmission and the uplink transmission time-periods.

According to another example of transmission coordination between DP 102 and each one of CPEs $104_1$, $104_2$, $104_3$, ..., $104_m$, DP 102 embeds an end of transmission symbol, which marks the end of the downlink transmission, at a known location in the frame (i.e., a predetermined symbol or symbols within the frame), before the actual end of the downlink transmission. Timing controller 124 of each one of CPEs $104_1$, $104_2$, $104_3$, ..., $104_m$ determines when to start transmitting before the end of the downlink transmission according to this end of transmission symbol, thus reducing latency between the end of the downlink transmission and the start of the uplink transmission. In yet another example, of transmission coordination between DP 102 and the each one of CPEs $104_1$, $104_2$, $104_3$, ..., $104_m$, DP 102 transmits a message (e.g. MAP) as part of the same downlink frame. This message includes information regarding the duration of the downlink, the maximal allowed uplink size or both. This information may be sent in a designated message or included as part of the uplink length message described hereinabove in relation to the uplink only zone (UL).

Figure 6:
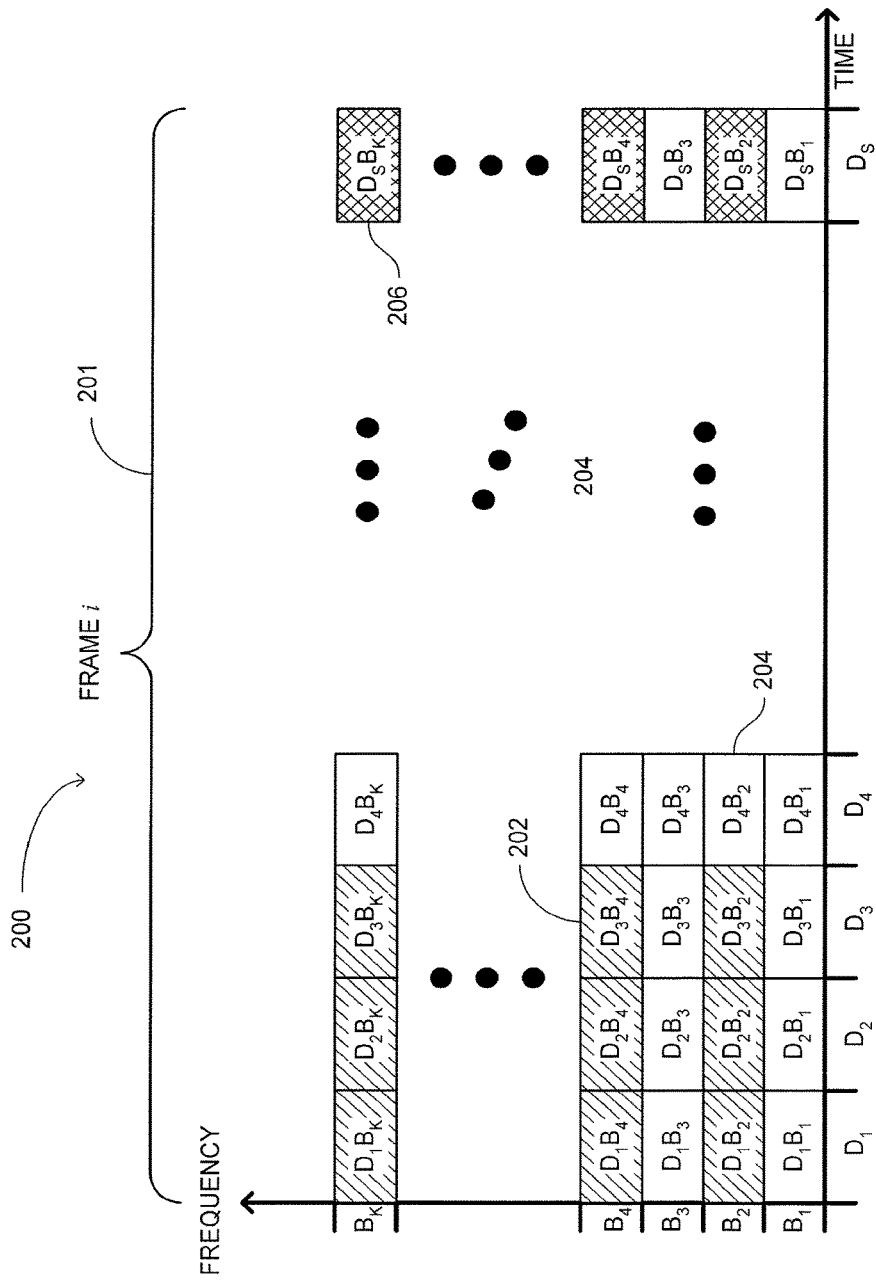
FIG. 6 is a schematic illustration of a frequency domain time domain transmission scheme in accordance with another embodiment of the disclosed technique.

In accordance with another embodiment of the disclosed technique, the transmission bandwidth of each time-slot in a frame is further divided into a plurality of sub-bands. The time duration of a time-slot in a frame, along with a sub-band, define a Logical Allocation Unit (LAU). Thus, each frame may be regarded as a two dimensional array of LAUs. Assigning LAUs to the CPEs facilitate an additional degree of freedom allowing implementation of power management and duplexing schemes. Reference is now made to FIG. 6, which is a schematic illustration of a frequency domain time domain transmission scheme, generally reference 200, in accordance with another embodiment of the disclosed technique. According to transmission scheme 200, frame 201, which is the ith frame in a super-frame, is divided into a plurality of time slots designated $D_1$, $D_2$, $D_3$, $D_4$, ..., $D_s$. The transmission bandwidth is divided into a plurality of sub-bands designated $B_1$, $B_2$, $B_3$, $B_4$, ..., $B_k$. An LAU is defined by a respective combination of a time slot and a sub-band. For example, LAU 202 is defined by the third time slot in frame 200, $D_3$ and the fourth sub-band $B_4$ and is designated $D_3B_4$. In another example LAU 204 is defined by the fourth time slot in frame 200, $D_4$ and the second sub-band $B_2$ and is designated $D_4B_2$. It is noted that the in description herein in conjunction with FIG. 6 regarding active-sets, as well as in the description hereinabove with reference to FIGS. 4A, 4B, and 4, the allocation of the transmission opportunities relates to either the allocation of transmission opportunities for payload data or to the allocation of transmission opportunities for both payload data and idle data used for crosstalk cancellation.

Similarly to the partitioning of a frame to a downlink zone, uplink zone and DL\UL zone, the LAUs may also be partitioned into three groups (i.e., downlink group, uplink group and DL\UL group). DP dynamic bandwidth allocator 108 allocates to each one of CPEs $104_1$, $104_2$, $104_3$, ..., $104_m$, a respective active-set. An active-set is defined as a set of LAUs, which may be used for transmission (i.e., either by DP 102 in the downlink active-set or by the CPEs $104_1$, $104_2$, $104_3$, ..., $104_m$ in the uplink active-set). An active-set includes a combination of selected LAUs. A portion of the selected LAUs are associated the downlink transmission and another portion are associated with the uplink transmission. When three groups are employed, yet another portion of the selected LAUs is associated with downlink\uplink transmission. As mentioned above, the LAUs are transmission opportunities. This means that the respective one of transceivers $116_1$, $116_2$, $116_3$, ..., $116_m$ and CPEs $104_1$, $104_2$, $104_3$, ..., $104_m$ associated with an active-set do not necessarily use all of the LAUs in the active-set.

The active-set associated with each one of CPEs $104_1$, $104_2$, $104_3$, ..., $104_m$ are mutually exclusive. Alternatively, the active-sets may overlap either in time, in frequency or in both (i.e., at least two of CPEs $104_1$, $104_2$, $104_3$, ..., $104_m$ are allocated at least one common LAU). In the example set forth in FIG. 6, the hatched LAUs, such as LAU 202, are the downlink LAUs and the cross hatched LAUs, such as LAU 206 are the uplink LAUs. The blank LAUs are DL\UL LAUs or un-allocated LAUs. An Active-set may change for each frame or for each super-frame or from time-to-time (e.g., according to changes in the power dissipation or temperature of DP 102 or according to changes in data traffic requirements). As further explained below, the allocation of an active-set of LAUs facilitates the control of the power consumption of both the DP and the CPE. The allocation of an active-set of LAUs facilitates also the reduction in Far End Crosstalk (FEXT) and vectoring requirements and facilitates multiplexed operation. DP dynamic bandwidth allocator 108 allocates an active-set according to at least a portion of the information included in the above mentioned bandwidth reports (i.e., either the required amount of data to be transmitted, the current active-set, allocation parameters and the like) and according to "frame filling" rules.

The "frame filling" rules include the frequency first rule, time first rule or the synchronized rule. According to the frequency first filling rule, the LAUs of the first symbol duration (i.e., the first time-slot) are allocated first, the LAUs of the second symbol duration are allocated next and so on. With reference to FIG. 6, LAUs $D_1B_1$-$D_1B_k$ are allocated first. LAUs $D_2B_1$-$D_2B_k$ are allocated next and so on. According to the time first filling rule, the LAUs of the first sub-band are allocated first, the LAUs of the second sub-band are allocated next and so on. With reference to FIG. 6, LAUs $D_1B_1$-$D_sB_1$ are allocated first. LAUs $D_1B_2$-$D_sB_2$ are allocated next and so on. According to the synchronized rule, the DP and the CPE coordinate the allocation of the LAUs there between. Nevertheless, it is noted that the selected LAUs in an active-set need not be adjacent to each other.

The frame structures described above in conjunction with FIGS. 4A, 4B, 5 and 6 facilitate the update of the downlink and uplink duration according to data transmission request (i.e., the amount of data to be transmitted). Long term update relates to updating the downlink and uplink duration to long term data transmission characteristics (e.g. video channels or large file transfers). In such case, updating the uplink and downlink time durations is performed once every one or more super-frames. Long term update may include a change of the active-set, a change of zone boundaries (FIG. 5) or both. A control message updating the downlink or uplink time duration is transmitted on a Dynamic Online Reconfiguration Channel (DOLRC). DOLRC is a designated control transmission opportunities in the frame, which allow updating the transmission parameters (e.g., uplink and downlink durations, bit loading tables and the like) without re-synchronizing the transceivers. Updating the downlink and uplink duration may be based on either information relating to the data transmission requirements of the currently running services (e.g., video streamer or a web browser) using the links or gathered data transmission statistics or both. However, such an updated rate does not facilitate updating the downlink and uplink time duration to an unexpected burst of data is to be transmitted Short term update relates to updating the downlink and uplink duration to an unexpected burst of data to be transmitted with minimal latency or buffering requirements. The short term update is based on the "three zones" described hereinabove in conjunction with FIG. 5 and especially to the DL\UL zone or group. During the DL\UL zone, both DP 102 and CPEs $104_1$, $104_2$, $104_3$, . . . , $104_m$ transmit according to need (i.e., either downlink transmission or uplink transmission respectively). However, since both DP 102 and at least one of CPEs $104_1$, $104_2$, $104_3$, . . . , $104_m$ can transmit concurrently in the DL\UL zone, the noise level in the DL\UL zone or group shall be different then the noise in the DL only or UL only zones. The noise and interference in the DL\UL zone shall be relatively low when no transmission occurs. The noise shall fluctuate when either DP 102, at least one of CPEs $104_1$, $104_2$, $104_3$, . . . , $104_m$ or both transmit (i.e., due to the existence of FEXT or NEXT). However, to facilitated robust transmission in the DL\UL zone, a fast retransmission scheme is employed, along with respective bit loading table associated with each zone (i.e., the bit rate in each of the zones may be different).

The Dynamic Bandwidth Allocation scheme presented hereinabove employs a two-leveled approach. At the first level, the transceivers (i.e., of the DP and the CPEs) are coordinated with respect to TDD timing. At this level, bandwidth allocation typically occurs at a relatively slow rate of change, either due to predetermined settings or a coarse adjustment of bandwidth allocation parameters as a result of information accumulated regarding data transmission needs over time. In both cases, the response time to changes in bandwidth allocation and the transition between bandwidth allocation parameter settings may occur over several frames or even super-frames. Such timing constraints, facilitates the implementation of a robust control protocol for managing the transition of DP and the CPEs to the new bandwidth allocation settings. The transition to the new bandwidth allocation settings must be fully synchronized between the DP and the CPEs. A typical synchronization point for such a transition is a super-frame boundary. The bandwidth allocation settings made at this level will further be referred to as the 'default bandwidth allocation settings'.

The next level of bandwidth allocation control is determined by bandwidth allocation requirements of the actual data traffic. Since in "real-world" data transmission traffic, the actual bit-rate varies with time, so are the actual bandwidth allocation requirements. Delay in allocating required bandwidth will result in increased latency and jitter across the network. Furthermore, the variability in the data bit rates and consequently the bandwidth requirements may change from frame to frame. Given the time duration of a frame (~1 ms), fully coordinated bandwidth allocation protocol between the DP and the CPEs would be difficult to achieve.

In light of the above, a fully dynamic "per-frame" bandwidth allocation scheme should meet following requirements:
  No coordination of UL bandwidth allocations is required between the DP and the CPEs.
  No overlap of UL and DL transmissions is allowed between the links.
  The CPEs should be able to react to bandwidth allocation directives from the DP within the same frame.
  A level of communication in the upstream direction between CPE and DP is guaranteed even when the downlink and uplink bandwidth allocation directives in the frame are lost.

The two-leveled approach to dynamic bandwidth allocation is compatible with the concept of a "service level" being defined in terms of guaranteed bit rate or committed information rate (CIR) and maximum bit rate or peak information rate (PIR). Based on this concept, the default bandwidth allocation settings would typically be specified to provide a level of service that meets CIR requirements. On the other hand, if bandwidth (i.e., transmission opportunities) available and actual traffic requirements exceed the default bandwidth resources allocated to meet CIR, then the per-frame dynamic bandwidth allocation scheme can be thought of as providing the additional transmission opportunities allocations needed to meet PIR.

A Media Access Plan (MAP) is sent in the downstream transmission of each TDD frame in order to communicate dynamic transmission parameters between the DP and each of the CPEs. The MAP data contains bandwidth allocation information that allows the CPEs to determine the "demarcation point" within the current frame between the downlink transmission and the uplink transmission. For example, using the maximum downlink transmission time in the MAP, the CPEs can determine the portion of the frame allocated to uplink transmissions.

The DP is responsible for setting the maximum downlink transmission periods in the MAP. The CPEs derive the earliest start time of the uplink transmission accordingly. In order to avoid crosstalk caused by overlapping uplink and downlink transmissions across links, all the transceivers within the DP should be coordinated with respect to the maximum downlink transmission periods. Since the DP specifies the same demarcation point between downlink and uplink transmissions in the MAP for all links and since and the CPEs derive the uplink transmission accordingly, there is substantially no overlap between uplink and downlink transmissions across links. Thus, with no MAP loss, bandwidth can be dynamically allocated per-frame in a way that guarantees the first three requirements outlined above. However, even in the event of complete MAP loss by one or more of the CPEs, all the requirements should still be guaranteed.

When the MAP is completely lost, a CPE which did not receive the MAP, does not know when the uplink transmission starts. In such a case, the CPE assumes that the uplink transmission starts no earlier than at a default uplink transmission opportunities settings and the DP guarantees that the uplink\downlink demarcation point specified in the MAP will never cross this default setting. Thus, in the event of complete MAP loss of the MAP, the CPE is guaranteed to have some transmission opportunities available for uplink transmission. This bandwidth is guaranteed in each frame by the first-level transmission opportunities allocation protocol and the allocated uplink transmission opportunities are guaranteed not to overlap with downlink transmission to any of the other CPEs. This guarantees the second and fourth requirements outlined in the bullets above.

Additionally, the DP should determine that the CPEs successfully decoded the current MAP and what is the expected start point in time of the respective uplink transmissions. Thus the DP first attempts to receive the uplink transmissions at the start of the uplink transmission designated in the MAP. When such a transmission is not found, the DP attempts to receive the uplink transmission at the start of the default uplink transmission time. Various methods can be used to detect whether a transmission exists or not at a particular location, for example, CRC check, detection based on preamble or pilot sequences, error at the frequency equalizer (FEQ) output QAM constellation error, and the like.

Figure 7:
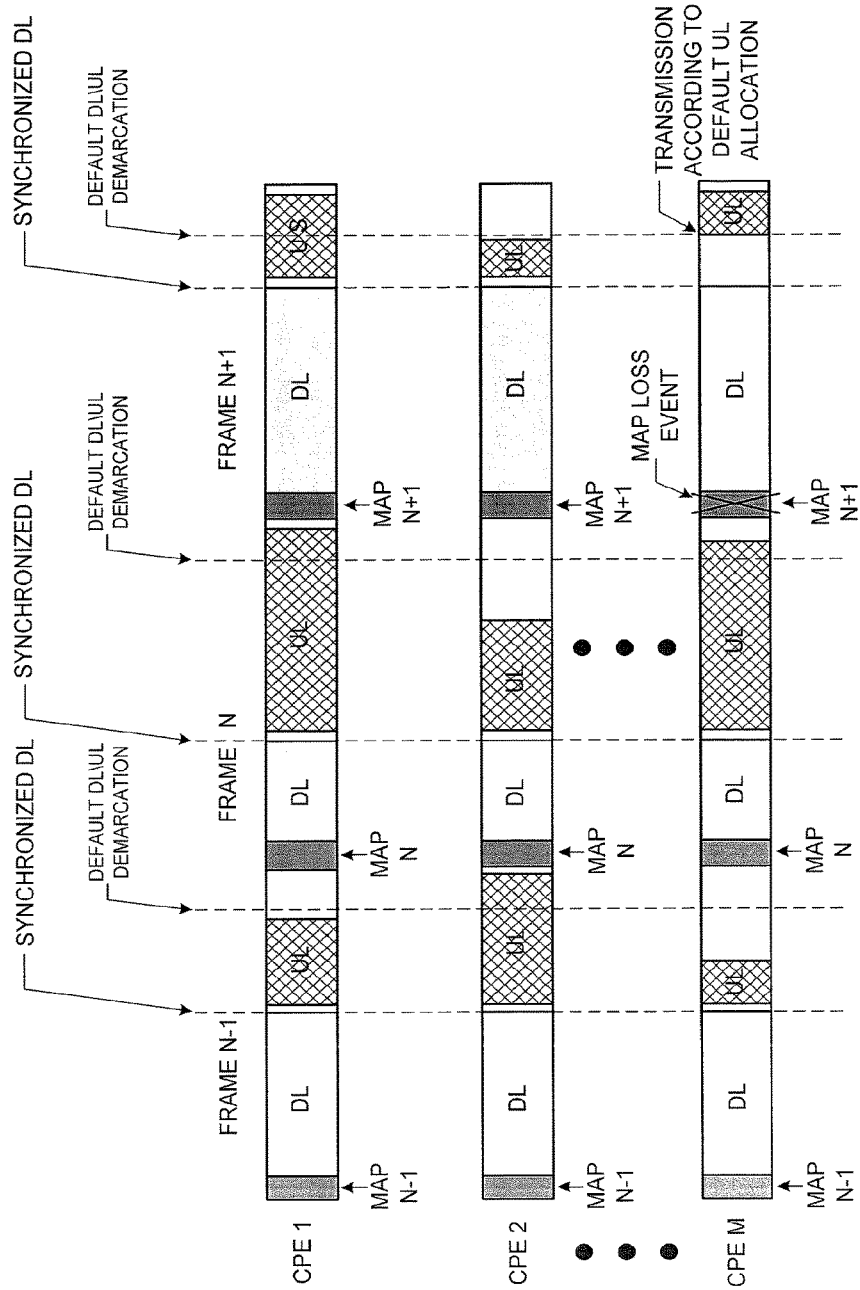
FIG. 7 is a schematic illustration of three consecutive frames across a number of links between a DP and CPEs, operative in accordance with a further embodiment of the disclosed technique.

Reference is now made to FIG. 7, which is a schematic illustration of three consecutive frames across a number of links between a DP and CPEs operative in accordance with a further embodiment of the disclosed technique. FIG. 7 shows the synchronization of DS transmissions across links and illustrates per-frame dynamic bandwidth allocation in both the downlink and the uplink. FIG. 7 further illustrates the event in which $CPE_M$ did not receive the MAP message relating to Frame N+1. As illustrated in FIG. 7 $CPE_M$ transmits the respective uplink data thereof only after the default demarcation. As mentioned above, the default demarcation guarantees that $CPE_M$ shall be allocated uplink transmission opportunities without overlap with the downlink transmission thereof or the downlink transmission of other CPEs.

Power Management

As mentioned above, the use of frame portioning (FIGS. 4A, 4B and 5) and active-sets (FIG. 6) facilitates control of power consumption at DP 102. With reference to FIG. 3, power controller 118 in DP dynamic bandwidth allocator 108 controls the power dissipation of DP 102 and of CPEs $104_1, 104_2, 104_3, \ldots, 104_M$. Dynamic bandwidth allocator 108 determines the active-set to meet either power dissipation requirements temperature dissipation requirements or both. As mentioned above, these temperature requirements include, for example, maintaining the temperature of DP 102 below a determined temperature threshold (i.e., either the temperature within DP 102 or the temperature of components of DP 102). The power requirements include maintaining the power dissipation of DP 102 to be below a power dissipation threshold.

When employing active-sets, each LAU is associated with a power dissipation value (i.e., since the power dissipation depends on frequency) or an energy dissipation value. Accordingly, DP dynamic bandwidth allocator determines the active set such that the cumulative amount of the respective power dissipation values or the energy dissipation values does not exceed a respective threshold (i.e., either a power threshold or an energy threshold).

According to one example, DP dynamic bandwidth allocator 108 determines an active-set such that the transmission of at least one of transceivers $116_1, 116_4, 116_3, \ldots, 116_m$ is cutoff at a respective transmission cutoff time. Alternatively, DP dynamic bandwidth allocator 108 determines an active-set such that the transmission of a group of selected transceivers $116_1, 116_4, 116_3, \ldots, 116_m$ is cutoff at a respective transmission cutoff time (i.e., all the transceivers in the group are associated with the same cutoff time). According to yet another alternative, each one of transceivers $116_1, 116_4, 116_3, \ldots, 116_m$ may be associated with respective transmission cutoff time. For example, power controller 118 limits the transmission of pertinent ones of transceivers $116_1, 116_4, 116_3, \ldots, 116_m$ to transmit only when data is available. Power controller 118 may also limit the transmission opportunities allocated to transceivers $116_1, 116_4, 116_3, \ldots, 116_m$ such that the temperature of DP 102 shall be maintained below a determined temperature threshold. Additionally, power controller 118 may limit the downlink transmission of at least one of transceivers $116_1, 116_4, 116_3, \ldots, 116_m$ or of a selected group or groups thereof. According to another example, when the amount of data to be transmitted in the downlink by one of transceivers $116_1, 116_4, 116_3, \ldots, 116_m$, in the current frame is relatively low (e.g., the data occupies less 10 percent of the downlink transmission symbols), power controller 118 indicates to the respective one of transceivers $116_1, 116_4, 116_3, \ldots, 116_m$, to differ the downlink transmission to the next frame.

Figure 8A:
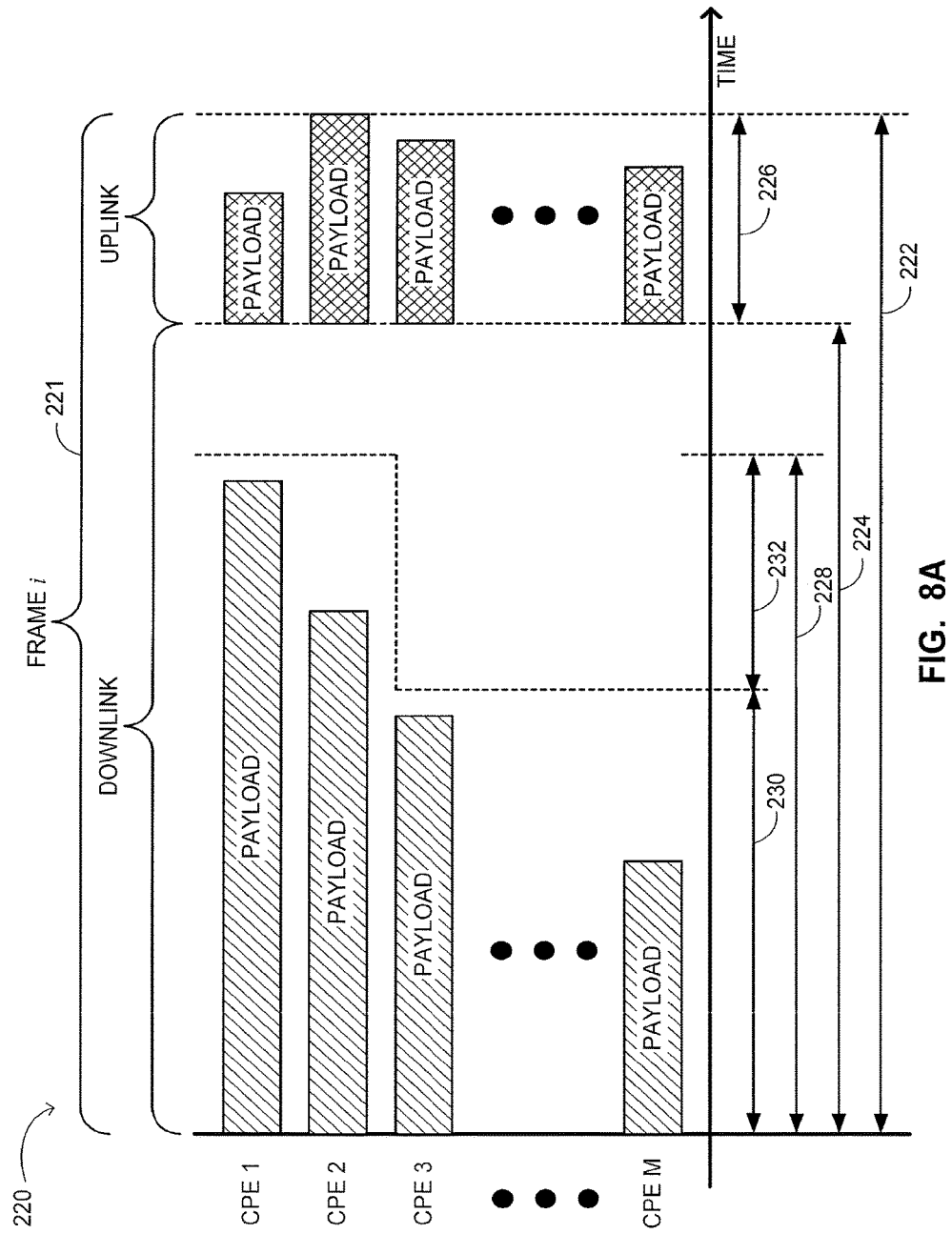
FIGS. 8A, and 8B are schematic illustrations of exemplary power control schemes in a communication system, in accordance with another embodiment of the disclosed technique.
Figure 8B:
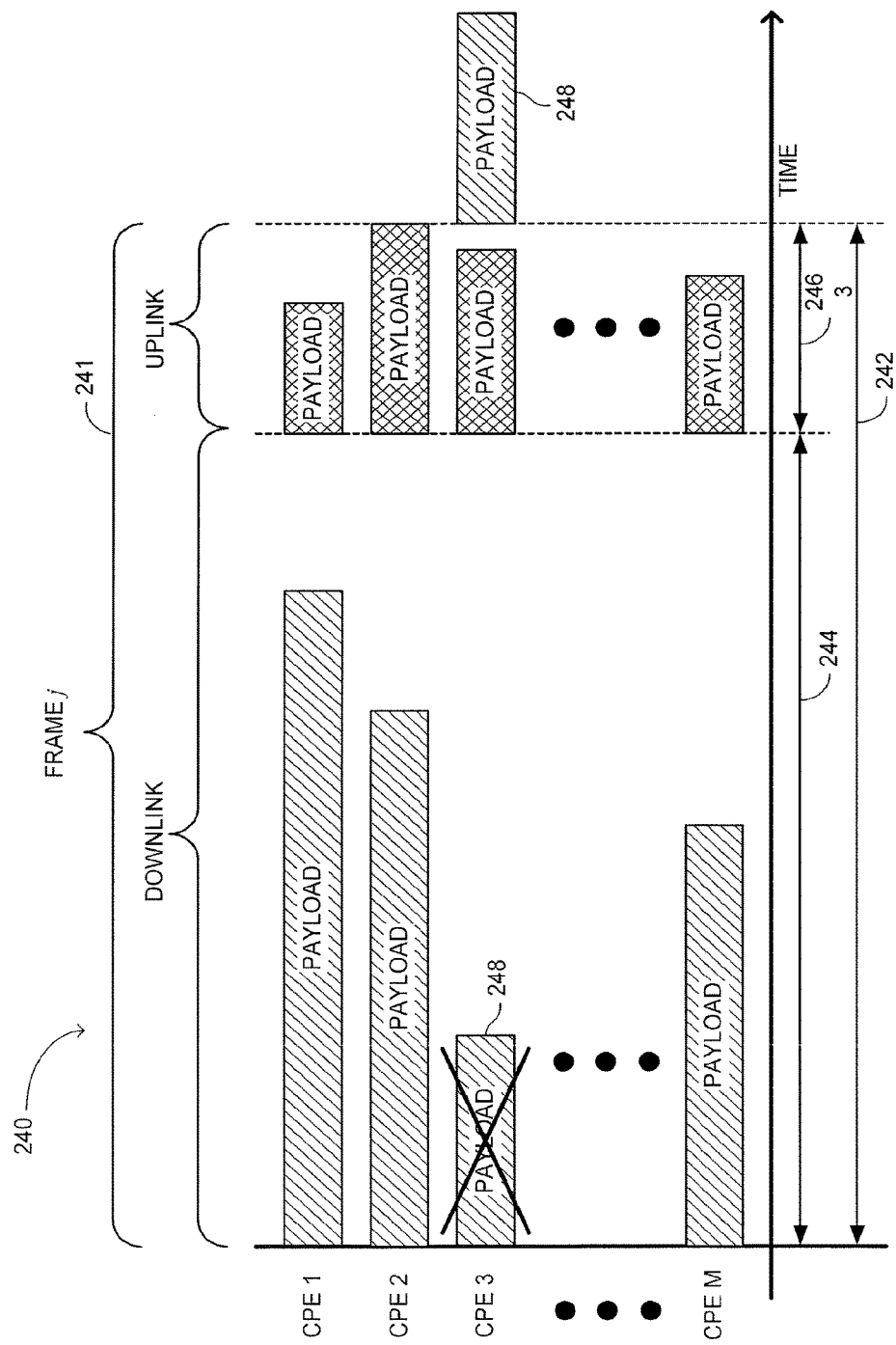

Reference is now made of FIGS. 8A and 8B, which are a schematic illustrations of an exemplary power control schemes, generally referenced 220, 240 and 260, in accordance with another embodiment of the disclosed technique. With reference to FIG. 8A, in power control scheme 220, frame 221 is the ith frame in a super-frame. Frame 221 is partitioned into a downlink time-period and a respective uplink time-period. Time-period 222 is designated for downlink transmission and time-period 224 is designated for uplink transmission. According to power control scheme 220, power controller 118 determines a transmission cutoff time for two groups of transceivers. In frame 221, power controller 118 (FIG. 3) limits the downlink transmission of transceiver $116_1$ associated with CPE 1 and of transceiver $116_2$ associated with CPE 2 to be no longer than time-period 228. Power controller 118 limits the downlink transmission of transceiver $116_3$ associated with CPE 3 to transceiver $116_m$ associated with CPE M to be no longer than time-period 230. In other words, power controller 118 determines a respective transmission cutoff time for a group consisting of transceiver $116_1$ and transceiver $116_2$ and a respective transmission cutoff time for a group consisting of transceiver $116_3$-$116_m$. Time-period 230 is shorter than time-period 228. Power controller 118 determines the downlink transmission cutoff according the amount of data to be transmitted to each of the respective CPEs $104_1, 104_4, 104_3, \ldots, 104_m$.

With reference to FIG. 8B, in power control scheme 240, frame 241 is the ith frame in a super-frame. Frame 241 is partitioned into a downlink time-period and a respective uplink time-period. Time-period 242 is designated for downlink transmission and time-period 244 is designated for uplink transmission. According to power control scheme 240, power controller 118 determines a transmission cutoff for one of transceivers $116_1, 116_4, 116_3, \ldots, 116_m$. In frame 241, transceiver $116_3$ associated with CPE 3, was supposed to transmit payload data 248 during the downlink transmission time-period 242. However, since amount of data that was to be transmitted in the downlink is low (e.g., less than 10 percent of the downlink transmission symbols), power controller 118 indicates to transceiver $116_3$ to postpone the transmission thereof during frame 241 and transmit payload data 248 during the downlink transmission time-period of the next frame. Accordingly, dynamic bandwidth allocator 108 may not allocate downlink transmission opportunities to CPE3 at frame 241. In other words, power controller 118 cancels the transmission of CPE3 at frame 241. Similarly, when the amount of data to be transmitted in the uplink is low, dynamic bandwidth allocator 108 may not allocate uplink transmission opportunities to the pertinent CRE.

Reducing power consumption of the CPE during uplink transmission may also be achieved by reducing the number of transmission opportunities of the CPE. However, when a frame is partitioned into three time-periods as described above in conjunction with FIG. 5 and the start of the uplink transmission is aligned with the end of the frame, transceivers $116_1, 116_2, 116_3, \ldots, 116_m$ continue to detect if the respective one of CPEs $104_1, 104_2, 104_3, \ldots, 104_m$ is transmitting (i.e., since the start time of the uplink transmission is unknown. To further reduce the power consumption during the uplink transmission, at the end of each uplink transmission, each one of CPEs $104_1, 104_2, 104_3, \ldots, 104_m$ sends the amount of data that CPE expects to send in the uplink time-period of the next frame excluding retransmissions (i.e., transmission requirements), according to the state of the data transmission queue (e.g., stored in a buffer). Optionally, the transmission requirements shall include the required bandwidth for data which require low latency (e.g., urgent data received at a CPE shortly before the start of transmission of the frame or quality of service requirements). DP dynamic bandwidth allocator 108 estimates the required uplink active-set of the next frame according to the information relating to the channel transmission rate, requested retransmissions and the amount of data to be transmitted during the downlink transmission periods, with the data sent by CPEs $104_1$, $104_2$, $104_3$, ..., $104_m$. As a further example, power controller 118 controls the power consumption by limiting the number of symbols or LAUs allocated for transmission (i.e., either downlink, uplink or uplink\downlink) for all CPEs during a frame or a super-frame. In other words, each frame or super-frame is associated with a pool of transmission opportunities (i.e., either symbols or LAUs for a specific link or for all links). The number of allocated transmission opportunities does not exceed the total number of transmission opportunities in the pool. The number of transmission opportunities in the pool is smaller than the total number of transmission opportunities in a frame or super-frame.

The process described above requires transmission coordination between DP 102 and CPEs $104_1$, $104_2$, $104_3$, ..., $104_m$. This coordination may be achieved by standardizing the way the upstream size is determined from the information provided to DP dynamic bandwidth allocator 108. In other words, DP dynamic bandwidth allocator 108 and each one of CPEs $104_1$, $104_2$, $104_3$, ..., $104_m$ shall perform the same process with the same input parameters to determine the start and duration of the downlink and uplink transmission time-periods. Alternatively, the transmission coordination may be achieved during the downlink transmission period by transmitting to CPEs $104_1$, $104_2$, $104_3$, ..., $104_m$ the maximal upstream transmission duration. This maximal transmission duration incorporates the transmission requirements of the CPEs $104_1$, $104_2$, $104_3$, ..., $104_m$. Thus, DP dynamic bandwidth allocator 108 determines the maximal downlink transmission period (i.e., or part thereof) and derives the maximal uplink transmission period therefrom. DP dynamic bandwidth allocator 108 transmits, via DP transceivers $116_1$, $116_4$, $116_3$, ..., $116_m$, the derived maximal uplink transmission period to CPEs $104_1$, $104_2$, $104_3$, ..., $104_m$. One possible way for sending the maximal uplink transmission period is in conjunction with a retransmission request message, since by the time the retransmission request is generated, DP 102 shall have the information required to determine the required uplink duration. Alternatively, the maximal uplink transmission period may be sent as a part of a control message (e.g., MAP) or in a designated message.

Figure 9:
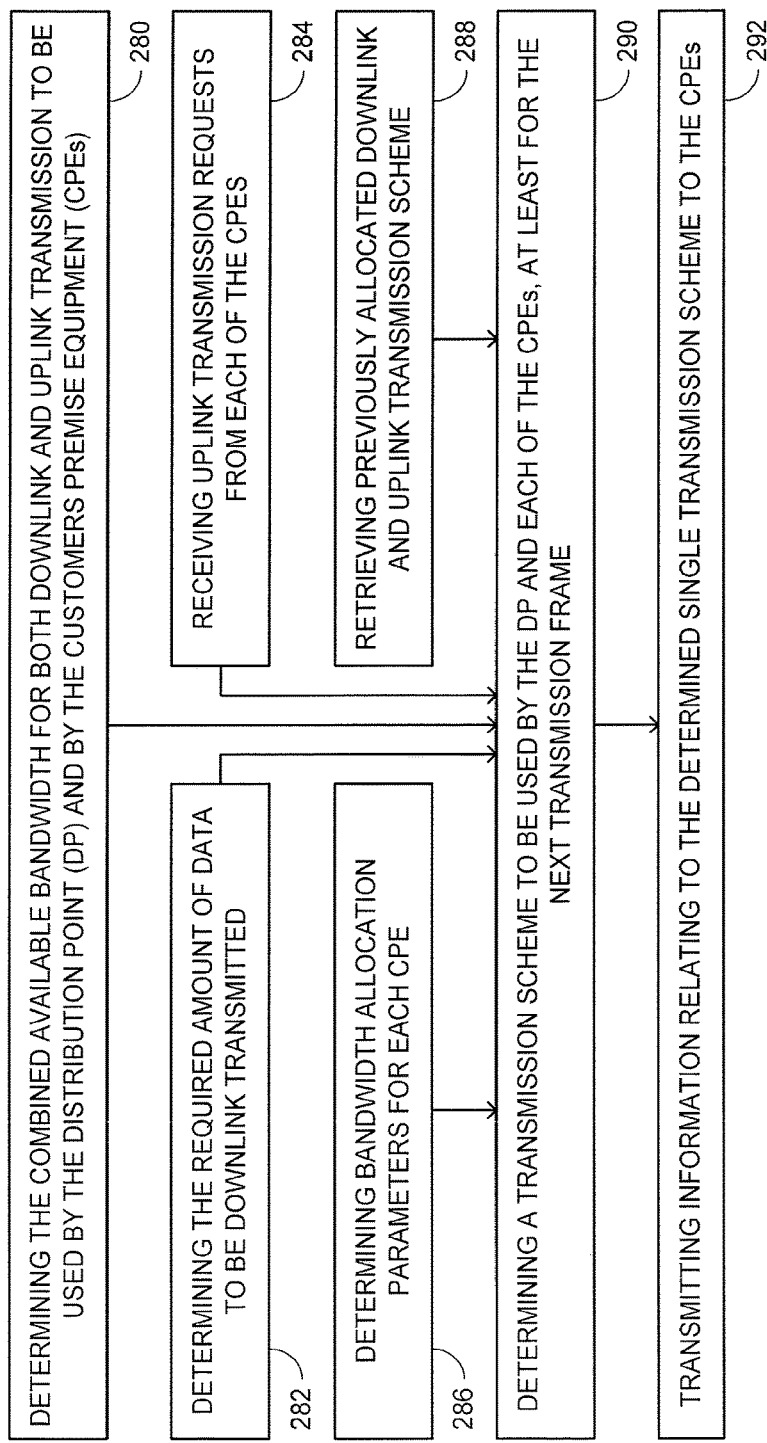
FIG. 9 is a method for determining a transmission scheme, in accordance with a further embodiment of the disclosed technique.

Reference is now made to FIG. 9, which is a method for determining a transmission scheme, in accordance with a further embodiment of the disclosed technique. In procedure 280, the combined available bandwidth for both downlink and uplink transmission to be used by the DP and the CPEs is determined. The combined available bandwidth is determined according to Bit Loading Tables (BLTs). These BLTs specify the number of bits assigned to each symbol of each sub-carrier. The BTLs are determined after channel probing is performed, according to the determined crosstalk and interference in each sub-channel. With reference to FIG. 3, DP dynamic bandwidth allocator 108 determines the combined available bandwidth for both downlink and uplink transmission. After procedure 200 the method proceeds to procedure 290.

In procedure 282 the required amount of data to be downlink transmitted is determined. This required amount of data is determined according to the amount of data stored in a downlink transmission buffer within the DP. With reference to FIG. 3, DP dynamic bandwidth allocator 108 determines the amount of data to be transmitted in the downlink. After procedure 202 the method proceeds to procedure 290.

In procedure 284, uplink transmission requests are received from each of the CPEs. These uplink transmission requests include the amount of data to be transmitted by each of the CPE during the uplink transmission. With reference to FIG. 3, DP dynamic bandwidth allocator 108 receives, via each one of transceivers $116_1$, $116_2$, $116_3$, ..., $116_m$, uplink transmission requests each one of CPEs $106_1$, $106_2$, $106_3$, ..., $106_m$. After procedure 204 the method proceeds to procedure 290.

In procedure 286, bandwidth allocation parameters are determined. These bandwidth allocation parameters are, for example, the guaranteed bit rate of each CPE, the priority of the data to be transmitted or maximum allowed bit rate of each CPE. With reference to FIG. 3, DP dynamic bandwidth allocator 108 determines the bandwidth allocation parameters. After procedure 206 the method proceeds to procedure 290.

In procedure 288, the previously allocated downlink and uplink transmission scheme is retrieved. With reference to FIG. 3, DP dynamic bandwidth allocator 108 determines the previously allocated downlink and uplink transmission opportunities. After procedure 288 the method proceeds to procedure 290.

In procedure 290, a transmission scheme, to be used by the DP and each of the CPEs, is determined at least for the next transmission frame. The transmission scheme includes at least downlink transmission opportunities and uplink transmission opportunities (i.e., as described above with reference to FIGS. 4A and 4B). The transmission scheme may further include uplink\downlink transmission opportunities (i.e., as described above with reference to FIGS. 4A and 4B). As mentioned above, a transmission opportunity may be either a time-slot in a frame or an LAU. Each transceiver in the DP transmit over at least a portion of the determined downlink transmission opportunities (i.e., the DP transceiver may use only a portion of the allocated downlink transmission opportunities, according to the amount of data to be transmitted). Each CPE may transmit over at least a portion of the determined uplink transmission opportunities (i.e., a CPE transceiver may use only a portion of the allocated uplink transmission opportunities, according to the amount of data to be transmitted). Furthermore, the transmission scheme is determined to meet power dissipation requirements temperature dissipation requirements or both. With reference to FIG. 3, DP dynamic bandwidth allocator 108 determines the downlink transmission opportunities and the uplink transmission opportunities determined for all the CPEs. After procedure 290, the method proceeds to procedure 292.

In procedure 292, information relating to the determined transmission scheme is transmitted to all of the CPEs. This information may be an explicit list of the downlink and uplink transmission opportunities. The information relating to the determined transmission opportunities may alternatively be an end of transmission message transmitted at the end of the downlink transmission opportunities. This information may also be a pointer to the last symbol of the downlink transmission (i.e., since CPEs are synchronized with the DP and thus, the first symbol and the last symbol of a frame is known to the CPEs). Additionally, information relating to the determined transmission opportunities may be the maximum downlink transmission time. With reference to FIG. 3, DP dynamic bandwidth allocator 108 transmits, via each one of transceivers $116_1$, $116_2$, $116_3$, ..., $116_m$, to each one of CPEs $104_1$, $104_2$, $104_3$, ..., $104_m$, information relating to the determined transmission opportunities and the uplink transmission opportunities.

Probing

Probing allows DP 102 and each one of CPEs $104_1$, $104_2$, $104_3$, ... $104_m$ to determined various parameters relating to the respective channels $105_1$, $105_2$, $105_3$, ... $105_m$ (e.g. channel impulse response, channel frequency response, noise floor, FEXT, and the like) and thus, to maximize the data throughput (i.e., the amount of data) that can be transmitted and received over each link. In other words, probing allows DP 102 and each one of CPEs $104_1$, $104_2$, $104_3$, ... $104_m$ to perform channel estimation. DP 102 and each one of CPEs $104_1$, $104_2$, $104_3$, ..., $104_m$ transmit respective probing signals at dedicated probing symbols within each frame or within each super-frame.

According to the disclosed technique, probing signals are used to estimate the channel response (i.e., impulse or frequency response) and crosstalk and to estimate noise and interference or alternatively Signal to Interference Noise Ratio (SINR) measurements. When estimating crosstalk, the probing signal is transmitted without pre-coding. When estimating noise and interference or SINR, the probing signal is pre-coded prior to transmission.

When estimating the channel impulse response and crosstalk, DP 102 and each one of CPE's $104_1$, $104_2$, $104_3$, ..., $104_n$, transmit the respective probing signal thereof on a fixed set of LAUs in the first frame of a super-frame. The probing signal for channel impulse response and crosstalk estimation is generally a random sequence of bits. This random sequence of bits may be explicitly specified. Alternatively, the random sequence of bits may be generated by a Pseudo Random Bit Generator. Thus, only the mask and the seed of the generator are specified. According to yet another alternative, the random bit sequence may be selected from a predefined set of sequences.

Since the response of each one of channels $105_1$, $105_2$, $105_3$, ..., $105_m$ and the crosstalk there between is to be measured concurrently, the probing signals assigned to each one of channels $105_1$, $105_2$, $105_3$, ..., $105_m$ are substantially orthogonal one with respect to the other thus, reducing the probability of error in each measurement at CPEs $104_1$, $104_2$, $104_3$, ..., $104_m$. Furthermore, each one of transceivers $116_1$, $116_2$, $116_3$, ..., $116_m$ and 120 should be able to discern between the different the probing signals. To that end, DP 102 and each one of CPEs $104_1$, $104_2$, $104_3$, ..., $104_m$ modulates each probing signal on an exclusive set of sub-channels respective of the probing signal, thus utilizing the orthogonality of the sub-channels. However, transmitting on a subset of sub-channels reduces the achievable measurement noise suppression since only a portion of the total signal power is transmitted and thus SNR measurement may be inaccurate.

According to one alternative for generating substantially orthogonal probing signals, DP vectoring controller 114 exploits the fact that the channel impulse response duration is typically shorter than the duration of a time-slot in a frame and generally shorter than the guard gap (e.g., cyclic prefix) between each transmitted DMT symbol. DP vectoring controller 114 generates a set of substantially orthogonal probing signals by taking a first probing (i.e., a reference) bit sequence and generating a plurality, D, of different versions of the signal. DP vectoring controller 114 generates the $d^{th}$ version by applying a cyclic shift of $(d-1) \cdot \Delta$ to the samples of the bit sequence relative to the first probing bit sequence, where $\Delta$ represent the cyclic shift. The cyclically shifted probing signals maintain respective orthogonality as long as the following conditions are satisfied:

$$D \leq \frac{SL}{\Delta}$$

where SL is the symbol length (i.e., the number of samples) excluding DMT guard gap.
  $\Delta \leq CEL \leq CPL$, where CEL is the channel effective impulse response (i.e., including timing ambiguities) and CPL is the DMT guard gap.

DP vectoring controller 114 assigns a probing signal to a link (i.e., either to each of transceivers $116_1$, $116_2$, $116_3$, ..., $116_m$ or to one of CPEs $104_1$, $104_2$, $104_3$, ..., $104_m$ by specifying an index respective of the assigned signal in the generated set or by explicit indicating the desired delay.

When the number of links is larger than the number of cyclic delays, two links may be assigned the same probing bit sequence. Thus, the probing signals of these two links shall not be orthogonal one with respect to the other and the probing signals shall not be resolvable at the transceivers. In such case, the orthogonality between the probing signals may be extended by using a sequence of probing symbols (e.g. two). According to one alternative, the two transceivers, which were assigned the same probing bit sequence, transmit the respective probing symbol thereof over a subset of the allocated probing symbols (e.g., each transceiver transmits the probing signal over one symbol when the probing symbol sequence includes two symbols). According to another alternative, the probing signals are modified to allow separation between irresolvable links. For example, when the probing signals respective of two links exhibit either the same cyclic delay or unresolvable delays, one probing signal may be multiplied by 1 and the other by −1 and the signals may be resolved by adding and subtracting one to and from the other.

The delay between probing symbols sequence is either fixed or changes in a known pattern from super-frame to super-frame, or from symbol to symbol (i.e., when probing signals are transmitted on different symbols). Changing the delay between probing symbols sequences reduces bias resulting from non-perfect orthogonality between the probing signals.

When estimating SINR, each one of DP transceivers $116_1$, $116_2$, $116_3$, ..., $116_m$ transmits an SINR probing signal using the pre-coding matrix that will be used during the downlink transmission. Furthermore, the location of the SINR probing signal in the frame should, as mentioned above, reflect the expected transmission times of each of transceivers $116_1$, $116_2$, $116_3$, ..., $116_m$ and thus the expected crosstalk between channels $105_1$, $105_2$, $105_3$, ..., $105_m$. To that end, a selected group of symbols within the first frame of a super-frame is be allocated to the SINR probing signal. Since pre-coding is applied to these SINR probing signals, orthogonality between the links need not be maintained and a different SINR probing signal may be selected for each link. Determining different SINR probing signals for each symbol for each frame may farther improve the SINR estimation.

Generally, probing signals are employed for different link conditions. These link conditions are link initialization, link re-synchronization and link tracking. When link initialization is required, DP 102 establishes a link between each one DP transceivers $116_1$, $116_4$, $116_3$, ..., $116_m$ and the respective CPE transceiver 120 of CPEs $104_1$, $104_2$, $104_3$, ..., $104_m$. When link re-synchronization is required, at least one of the links as lost synchronization and requires to re-synchronize (i.e., in order to minimize the loss of data). When link tracking is required, the links are established, however, it is required to track the changes in the channel parameters of each of the links.

In a point-to-point link, three different probing signals may be defined for each link condition. However, the high level of FEXT in a communication system such as described above with reference to FIG. 3 (e.g., G.fast), entails that the probing signals are transmitted according to the predicted transmission time-periods of each one of transceivers $116_1$, $116_2$, $116_3$, ..., $116_m$. For example, when transceiver $116_1$ is predicted to transmit concurrently with transceiver $116_3$, then the probing signal transmitted by transceivers $116_1$ and $116_3$ should also be transmitted concurrently. Thus, the transmitted probing signals reflect either the predicted changes in crosstalk or non-optimal crosstalk cancellation as a result of constraints (e.g., size) of the pre-coder matrix. To that end, the transmission times of the probing signals are synchronized across the links to allow FEXT and noise estimation. Furthermore, a probing signal in one link should be distinguishable for the probing signal of other links and links that are being initialized or resynchronized should not interfere with links that are synchronized.

To meet the above requirements, DP 102 and each one of CPE's $104_1$, $104_2$, $104_3$, ..., $104_m$ place the respective probing signals thereof at respective predefined symbol locations in a super-frame (i.e., assuming DP 102 is synchronized with all of CPE's $104_1$, $104_2$, $104_3$, ..., $104_m$). To enable the channel estimation to reflect the transmission periods of each one of transceivers $116_1$, $116_2$, $116_3$, ..., $116_m$ during the new super-frame, the probing signals are positioned at the first frame of the super-frame. A probing signal transmitted by either DP 102 or one of CPE's $104_1$, $104_2$, $104_3$, ..., $104_m$ may be a static probing signal, a semi-static probing signal, a request driven probing signal (e.g., new CPE may join and the respective channel needs to be estimated) or active-set change driven probing signal, thus providing flexibility in the positioning of the probing signals within the frame. DP 102 or one of CPE's $104_1$, $104_2$, $104_3$, ..., $104_m$ transmit a static probing signal at over a predefined set of symbols in each super-frame. DP 102 or one of CPE's $104_1$, $104_2$, $104_3$, ..., $104_m$ transmit a semi-static probing signal over a predefined set of symbols unless otherwise indicated by DP 102 (e.g. due to the overhead in transmission caused by the transmission of probing signals). The request driven probing signal is transmitted upon request by DP 102 on one or more super-frames. The active-set change driven probing signal is transmitted after a change in the active-set occurred (e.g., following a change in the required bandwidth by one CPEs $104_1$, $104_2$, $104_3$, ..., $104_m$). DP 102 and each one of CPE's $104_1$, $104_2$, $104_3$, ..., $104_m$ transmit the respective probing signal thereof on the first frame of the super-frame using the new active-set. The probing signal can be used in this case as an active-set change acknowledgment signal. The probing signal may also be sent before the change in the active-set occurred. In such a case, the probing signal is used to predict the transmission parameters (e.g., BLT) and to facilitate optimal selection of the new active-set.

A probing signal can be transmitted on the first symbol of a frame, on all the symbols of the frame (i.e., probing signals occupies all of the frame), or on a set of LAUs that is specified as part of the transmission requests. The DP 102 and each one of CPE's $104_1$, $104_2$, $104_3$, ..., $104_m$ may transmit the respective probing signal thereof over all sub-channel or on a sub-set of sub-channels. The sub-channels that do not include a probing signal may include data.

The actual link condition (i.e., generally SINR) may depend on the active-set used (i.e., as mentioned above, which transceivers transmit concurrently). Two scenarios exist when each CPE is associated with only one active-set, with no dynamic re-assignment of active-set. According to one scenario, the active-set is shared as a whole with a sub-set of the links, with no partial overlap with any of the other links. In such a case it is sufficient to set one common SINR estimation symbol for which appropriate bit loading may be determined. According to another scenario, a partial over-lap of uplink and downlink active-sets may exist. In such a case, the actual line condition may change intra-frame (i.e., assuming the overlap is over symbols and not frames) and multiple probing symbols are assigned to reflect the different channel conditions which exist in the frame. Furthermore, the BLT may be calculated in a way that will allow error free operation over the changing line conditions. Other implementation options may be, for example, to dynamically change the active-set used, which may further be used for dynamic association to vectoring groups, change of active-set as a result of power management consideration or dynamic interference management.

Dynamic change in the active-set employs the use of multiple probing symbols. The different probing symbol may be used, for example, to represent different vectoring groups associated with the link or to represent current and future active-set. SINR probing symbols representing future active-sets are used to determine the transmission parameter for the time when this new active-set shall become active or to determine if this new active-set should be used at all.

Furthermore, the receiver may assign different BLT to the different probing symbols. The association of the probing symbols to the different BLT can be achieved through explicit indication of which probing symbol relates to which BLT or through an indication which BLT relates to that specific probing symbol.

According to another embodiment of the disclosed technique, efficient probing signals are determined to allow estimating near end and far end cross talk (FEXT) channel estimation. The signals are designed to enable non-constraint estimation performance and facilitate shortening the time required to estimate the channel (i.e., within a pre-defined estimation error). In the description which follows, eight channels are employed to exemplify the disclosed technique. However, the method applicable to any number of probing signals Efficient probing should be based on orthogonal signals. The simplest way to generate an orthogonal sequence is to transmit the probing signals in a manner which is mutually exclusive in time (i.e., each one of transceivers $116_1$, $116_2$, $116_3$, ..., $116_m$ transmits the respective probing signal thereof in turn). Denoting $\overline{S}$ as the vector of probing sequences assigned to the links $\overline{S}=\{s_1, \ldots s_g\}$, where $s_j$ being the probing symbol used by the jth link, and denoting $\overline{TS}$ as the transmitted probing sequences transmitted by of transceivers $116_1$, $116_2$, $116_3$, ..., $116_m$, $\overline{TS}=\{ts_1, \ldots ts_8\}$, where $ts_j$ being the jth transmitted probing symbol. $\overline{TS}$ is determined as follows:

$$\overline{TS} = TM \times \overline{S} \tag{1}$$

where TM represents a transmission matrix:

One possible transmission matrix is represented by equation (2) as follows:

$$TM = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix} \quad (2)$$

While the matrix presented in equation (2) is orthogonal, it does not gain noise suppression. The matrix presented in equation (2) exhibits a noise suppression factor of 1. This noise suppression factor relates to the number of signals used (e.g., averaged) when determining the signal to noise ratio.

However, the transmission matrix may be a Walsh-Hadamard matrix presented in equation (3) as follows:

$$G = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix} \quad (3)$$

The matrix G may be generated using the following recursive process as presented in equations (3) and (4) which follow:

$$G_0 = 1 \quad (4)$$

$$G_n = \begin{bmatrix} G_{n-1} & G_{n-1} \\ G_{n-1} & -G_{n-1} \end{bmatrix}, n > 1 \quad (5)$$

Accordingly, any Walsh-Hadamard matrix of any size which is a power of 2 may be determined employing equations (4) and (5).

Denoting $G_{i:j}$ as a sub-matrix which includes all the rows between the ith row and the jth row of G, the following characteristics of G are noted:

$$G \times G^T = \begin{bmatrix} 8 & 0 & 0 & 0 & 0 & 0 & 0 & 0 \\ 0 & 8 & 0 & 0 & 0 & 0 & 0 & 0 \\ 0 & 0 & 8 & 0 & 0 & 0 & 0 & 0 \\ 0 & 0 & 0 & 8 & 0 & 0 & 0 & 0 \\ 0 & 0 & 0 & 0 & 8 & 0 & 0 & 0 \\ 0 & 0 & 0 & 0 & 0 & 8 & 0 & 0 \\ 0 & 0 & 0 & 0 & 0 & 0 & 8 & 0 \\ 0 & 0 & 0 & 0 & 0 & 0 & 0 & 8 \end{bmatrix} \quad (6)$$

According to equation (6), the noise suppression factor of G is 8 (i.e., since all eight signals are summed). Another feature of the Walsh-Hadamard matrix presented in equation (3) is presented in equation (7) and (8) below as follows:

$$G_{1:2}^T \times G_{1:2} = \begin{bmatrix} 2 & 0 & 2 & 0 & 2 & 0 & 2 & 0 \\ 0 & 2 & 0 & 2 & 0 & 2 & 0 & 2 \\ 2 & 0 & 2 & 0 & 2 & 0 & 2 & 0 \\ 0 & 2 & 0 & 2 & 0 & 2 & 0 & 2 \\ 2 & 0 & 2 & 0 & 2 & 0 & 2 & 0 \\ 0 & 2 & 0 & 2 & 0 & 2 & 0 & 2 \\ 2 & 0 & 2 & 0 & 2 & 0 & 2 & 0 \\ 0 & 2 & 0 & 2 & 0 & 2 & 0 & 2 \end{bmatrix} \quad (7)$$

$$G_{1:4}^T \times G_{1:4} = \begin{bmatrix} 4 & 0 & 0 & 0 & 4 & 0 & 0 & 0 \\ 0 & 4 & 0 & 0 & 0 & 4 & 0 & 0 \\ 0 & 0 & 4 & 0 & 0 & 0 & 4 & 0 \\ 0 & 0 & 0 & 4 & 0 & 0 & 0 & 4 \\ 4 & 0 & 0 & 0 & 4 & 0 & 0 & 0 \\ 0 & 4 & 0 & 0 & 0 & 4 & 0 & 0 \\ 0 & 0 & 4 & 0 & 0 & 0 & 4 & 0 \\ 0 & 0 & 0 & 4 & 0 & 0 & 0 & 4 \end{bmatrix} \quad (8)$$

similar results can also be achieved with the following matrix multiplications $G_{3:4}^T \times G_{3:4}$, $G_{5:6}^T \times G_{5:6}$, $G_{7:8}^T \times G_{7:8}$, $G_{3:6}^T \times G_{3:6}$ and $G_{5:8}^T \times G_{5:8}$.

When employing the Walsh-Hadamard matrix as the transmission matrix for a set of probing signals $\overline{S}$, a transmission matrix G is defined to achieves full orthogonality for eight transmissions and exhibit a noise rejection factor of 8. When employing the above mentioned probing signals, which are cyclic delayed versions of the same signal, the delay of probing signal $s_j$ is given by:

$$\frac{j-1}{8} T_{symbol} \quad (9)$$

where $T_{symbol}$ represents the time duration of a symbol. With such a set of probing signals, before applying G, the different channel responses can be estimated as long as the channel response are shorter than ⅛ of the symbol time duration (i.e., assuming, as per the example, eight probing signals are used).

After applying G to the probing sequence $\overline{S}$ and using the above results for $G_{1:2}^T \times G_{1:2}$, and similarly for $G_{3:4}^T \times G_{3:4}$, $G_{5:6}^T \times G_{5:6}$ and $G_{7:8}^T \times G_{7:8}$, when the channel response duration is a ¼ of a symbol duration, a noise rejection factor of 8 and full orthogonality is achieved for each of the first and second, third and fourth, fifth and sixth and seventh and eighth signals respectively. When the channel response duration is ½ of a symbol duration and using the results for $G_{1:4}^T \times G_{1:4}$ and similarly to $G_{3:6}^T \times G_{3:6}$ and $G_{5:8}^T \times G_{5:8}$, a noise rejection ratio of 8 and full orthogonality is achieved for the first and fourth, third and sixth and fifth and eighth signals respectively. It is also noted that when attempting to start at a random position in the symbols sequence, ¼ symbol, ½ symbol, or full symbol orthogonallity can be reached at most after 3, 6, or 8 symbols correspondingly. Thus, a selected pair of signals may be separable.

Figure 10A:
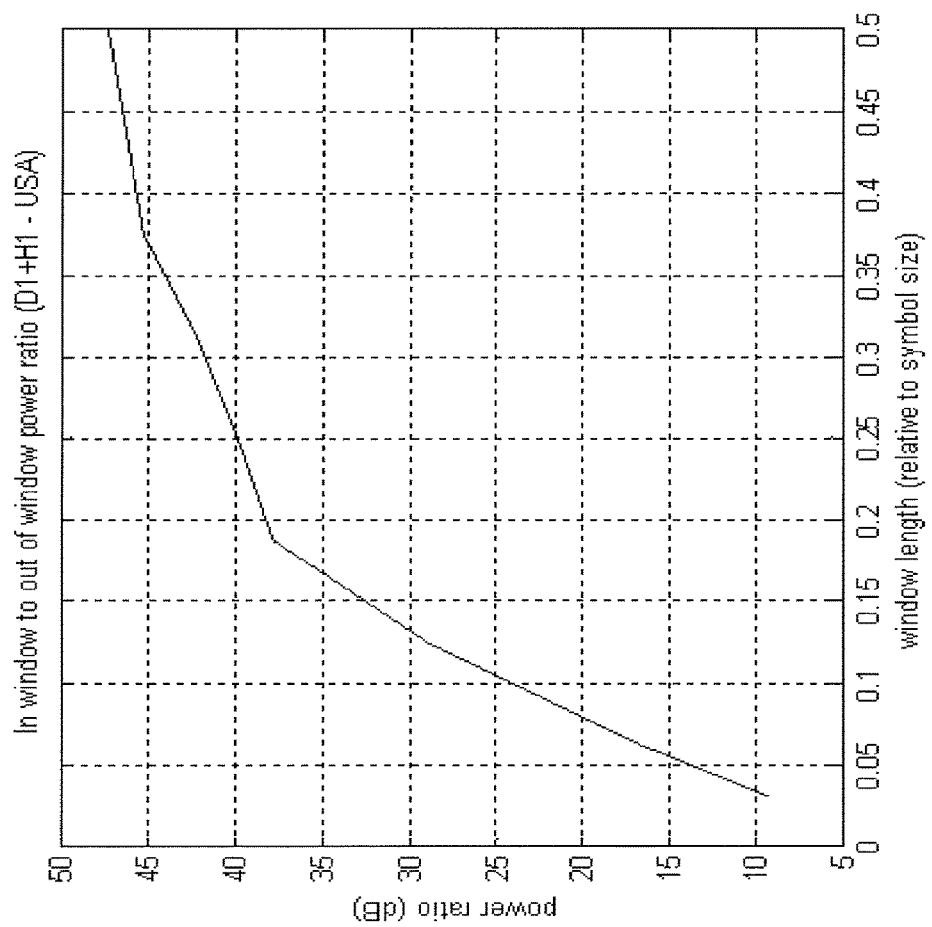
FIGS. 10A and 10B are schematic illustrations of graphs in accordance with another embodiment of the disclosed technique.
Figure 10B:
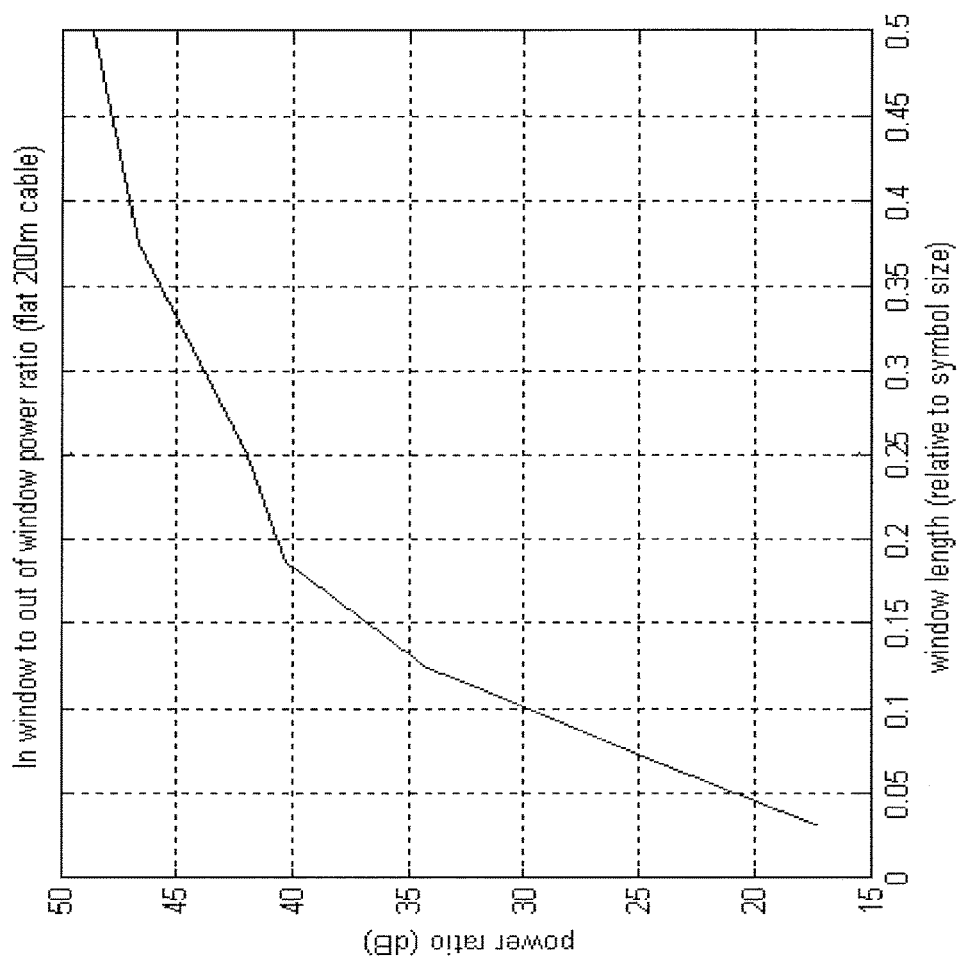

Following is a comparison relating to channel estimations between the above described channel estimation method employing the Walsh-Hadamard matrix and channel estimation method employing time exclusive transmission of the probing signals. To estimate the required channel impulse response duration, the estimation error employing the above probing signals needs to be determined. Reference is now made to FIGS. 10A and 10B which are schematic illustrations of graphs in accordance with another embodiment of the disclosed technique. FIG. 10A is a schematic illustration of a graph that plots the ratio of in-window to out-window power in decibels (dB) as a function of window length for a combination of final drop wire (D1-USA) and in-premises wiring (H1-USA). The term 'window" herein refers to the measurement time span within each time-slot in the frame. FIG. 10B is a schematic illustration of a graph that plots the ration of in-window to out-window power (in dB) as a function of window length for a 200 meter loop. Furthermore, it is assumed that no signal below 4 MHz is transmitted and typically the signals are transmitted between 80-90 MHz.

The first case is when full channel acquisition is required (i.e., no a priori information regarding the channel exists). Assuming channel $105_1$ (FIG. 3) is to be estimated along with the FEXT induced by all the other channels. Furthermore, the noise due to the transmitted probing signals should be no more that 1 dB and the FEXT cancellation should be 30 dB. To achieve these goals the total noise should be −6 dB lower than the background noise. When eight channels are employed the error due to estimation noise includes eight contributors (one self and seven FEXT). It is assume that half of the noise budget relates to the channel being estimated (i.e., $105_1$ in FIG. 3) and the other half relates to the FEXT channels estimation. This results in 9 dB noise suppression in the channel being estimated and 17.6 dB for each of the FEXT channels.

To meet the above noise budget eight full channel measurements should be averaged. When using the single transmission at a time method, 64 transmissions of probing signals are required to estimate channel $105_1$. When using the above described probing signals scheme only 8 transmissions of probing signals are required to estimate channel $105_1$. To achieve FEXT cancellation of 30 dB when estimating the FEXT of channel $105_1$, according to the above graphs, a channel response duration of ⅛ of a symbol is required. Thus, when employing a single transmission at a time, 56 transmission of probing signals are required to achieve the FEXT cancellation while only 7 transmissions are required when employing the above described probing method. Thus, new proposed probing signals requires ~⅛ the time (or alternatively BW) to achieve synchronization.

Similarly, when estimating the reaction time to a substantial FEXT disturber, or alternatively, an introduction of a new disturber, 8 transmission of probing signals are required to estimate the FEXT channel response. As described above a single measurement results in approximately 6 dB noise suppression in the estimation of a FEXT channel. Thus, near optimal performance may be achieved after single measurement. Employing the above proposed probing signals, one transmission of a probing signal is sufficient to achieve the desired estimation (i.e., since the self and FEXT channels are known) and a factor of 8 in the estimation speed is gained.

When transmitting messages from the CPE to the DP, the dynamic range of the signal required to transmit these messages, is high since the channel and FEXT interferences should be overcome. However, to reduce the bandwidth required for the transmission of measurement messages, differential transmission may be employed. With differential transmission, the message measurement samples are multiplied with the entry corresponding to the self-channel in the G matrix. Then, only the difference from previous measurement is sent. Consequently, the measurements only need to represent the dynamic range of the FEXT channels. If a further reduction in the dynamic range of the measurement samples is needed, the transmitted signal may be pre-coded. Alternatively, only the differences between the measurements samples of all received probing signals, (i.e., relating to all the transceiver pairs) are transmitted (i.e., which requires storing all eight received probing sequence).

At the initialization stage, when the DP starts communicating with a new CPE, neither the vectoring pre-coding nor the active-set assignment is known. To minimize the effect of the initialization process on active CPEs, the initialization process should avoid interference at the preliminary stage.

Figure 11A:
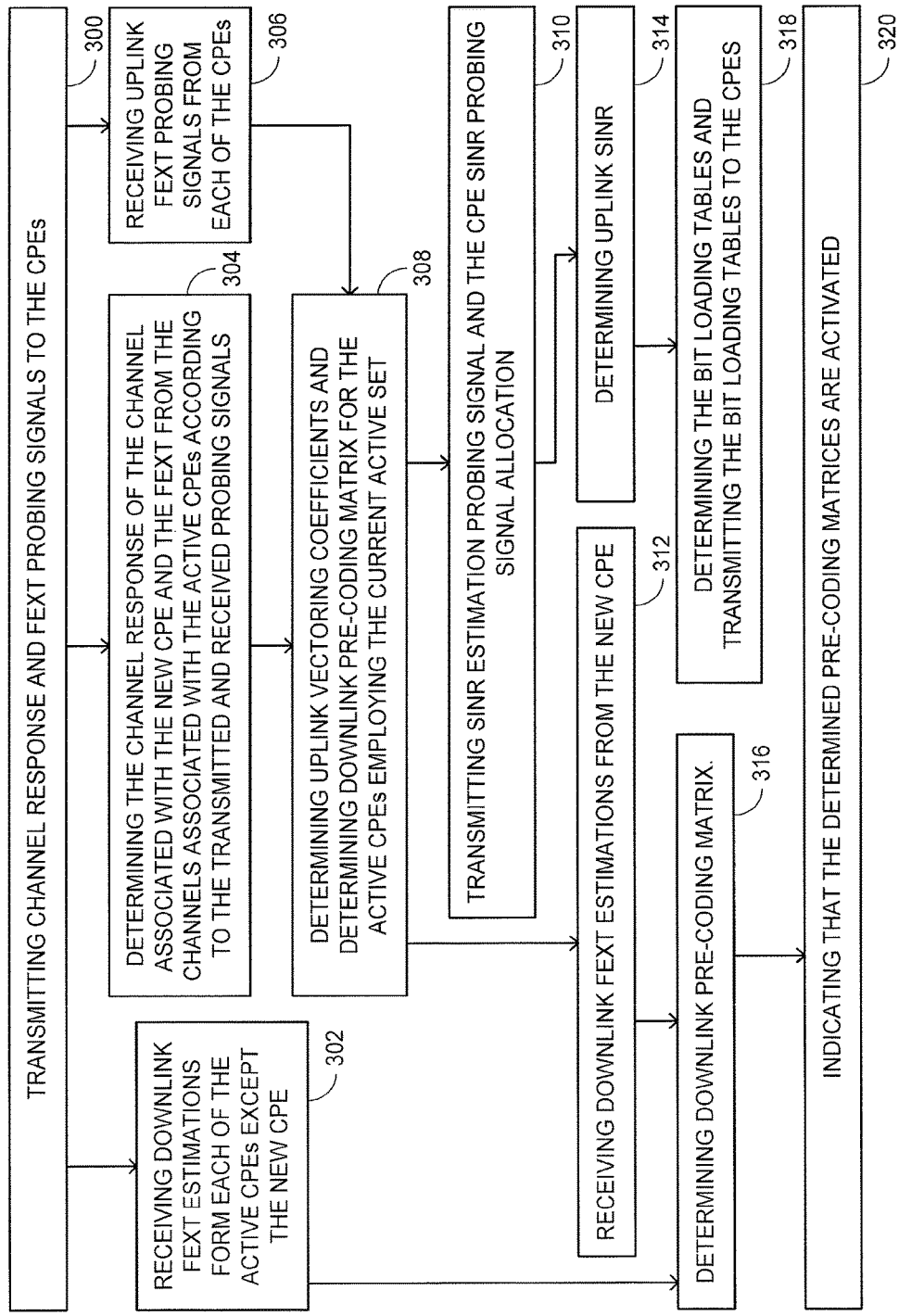
FIGS. 11A and 11B are schematic illustration of initialization and synchronization methods of a new CPE, in accordance with a further embodiment of the disclosed technique.
Figure 11B:
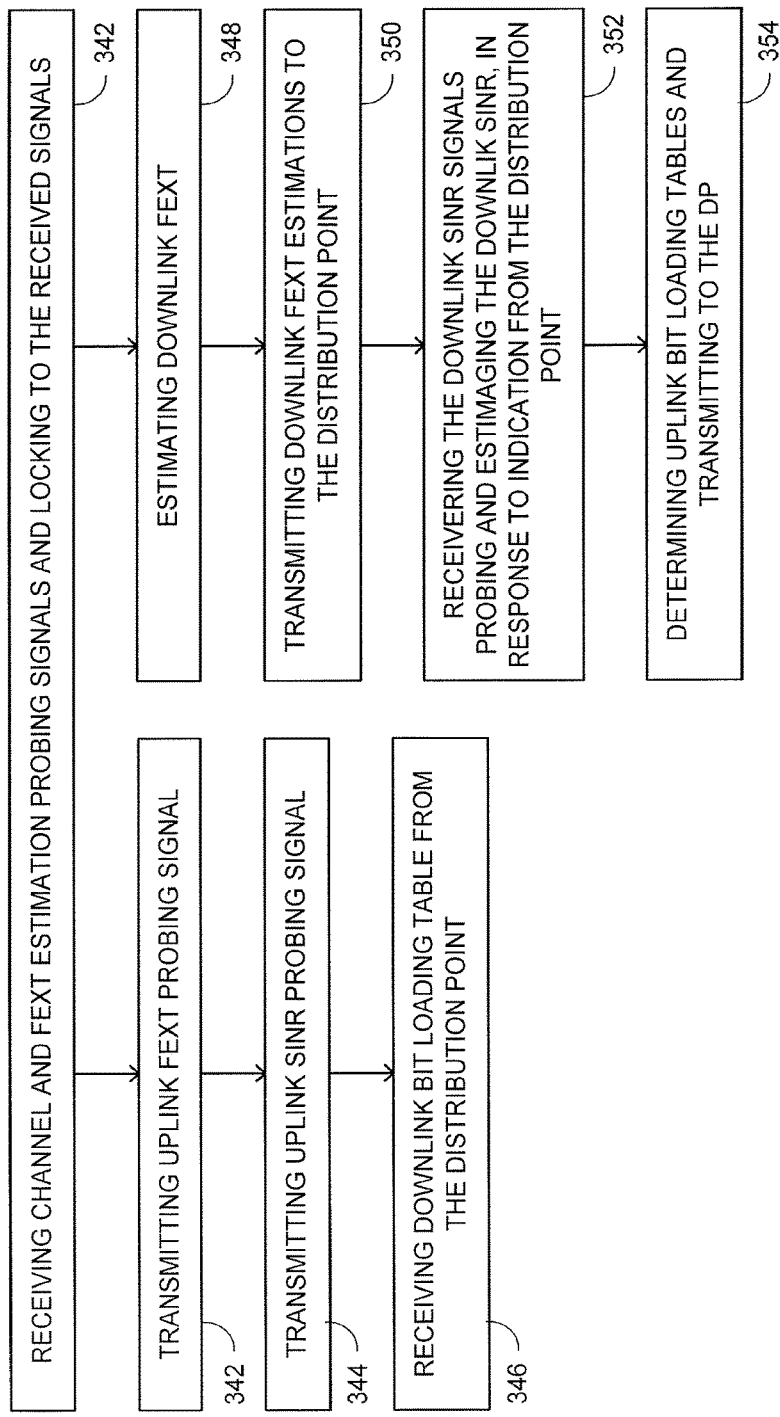

Reference is now made to FIGS. 11A and 11B which are schematic illustration of initialization and synchronization methods of a new CPE, in accordance with a further embodiment of the disclosed technique. FIG. 11A illustrates the method at the DP and FIG. 11B illustrates the method at the new CPE.

With reference to FIG. 11A, in procedure 300, channel response and FEXT probing signals are transmitted to the CPEs. These channel response and FEXT probing signals are transmitted without pre-coding. With reference to FIG. 3, DP vectoring controller 114 transmits via transceivers $116_1$, $116_2$, $116_3$, ..., $116_M$ channel response and FEXT probing signal. After procedure 300 the method proceeds to procedures 302, 304 and 306.

In procedure 302, downlink FEXT estimations are received from each of the active CPEs (i.e., except the new CPE). These downlink FEXT estimations relate to the FEXT estimated by each of the active CPEs with respect to the other CPEs (i.e., including the new CPE). With reference to FIG. 3, each one of transceivers $116_1$, $116_2$, $116_3$, ..., $116_M$ receives downlink FEXT estimations from each of the active CPEs and provide these estimations to DP vectoring controller 114. After procedure 302 the method proceeds to procedure 316.

In procedure 304, the channel response of the channel associated with the new CPE and the FEXT from the channels associated with the active CPEs is determined according to the transmitted and received probing signals. With reference to FIG. 3, DP vectoring controller 114 determines the channel response of the channel associated with the new CPE and the FEXT from the channels associated with the active CPEs is determined according to the transmitted and received probing signals. After procedure 304 the method proceeds to procedure 308

In procedure 306, uplink FEXT probing signals are received from each of the CPEs. These probing signals are used to determine the uplink FEXT and the uplink vectoring coefficients. With reference to FIG. 3, each one of transceivers $116_1$, $116_2$, $116_3$, ..., $116_M$, receives the uplink FEXT probing signals and provide these signals to DP vectoring controller 114.

In procedure 308, uplink vectoring coefficients and a downlink pre-coding matrix is determined for the active CPEs employing the current active-set. These vectoring coefficient and downlink pre-coding matrix incorporate the downlink transmission to the new CPE. With reference to FIG. 3, DP vectoring controller 114 determines uplink vectoring coefficients and a downlink pre-coding matrix for the active CPEs employing the current active-set. After procedure 308 the method proceeds to procedures 310 and 312.

In procedure 310, SINR estimation probing signals and CPE SINR probing signal allocation are transmitted. These transmitted SINR estimation probing signals are pre-coded prior to transmission. The new CPE SINR probing signal allocation provides the new CPE with allocation in the frame for transmitting the SINR probing signals thereof. With reference to FIG. 3, DP vectoring controller 114 transmits via transceivers $116_1$, $116_2$, $116_3$, ..., $116_M$ SINR estimation probing signals and CPE SINR probing signal allocation. After procedure 310 the method proceeds to procedure 314.

In procedure 312, downlink FEXT estimations are received from the new CPE. With reference to FIG. 3, the respective one of transceivers $116_1$, $116_2$, $116_3$, ..., $116_M$ associated with the new CPE receives the SINR estimations respective and provide these estimations to DP vectoring controller 114 After procedure 312 the method proceeds to procedures 316.

In procedure 314, uplink SINR is determined. With reference to FIG. 3, DP vectoring controller 114 determines the uplink SINR. After procedure 314 the method proceeds to procedures 318.

In procedure 316, the downlink pre-coding matrix is determined. This pre-coding matrix is determined according to the downlink FEXT estimation of all the CPEs (i.e., including the new CPE). With reference to FIG. 3, DP vectoring controller 114 determines the downlink pre-coding matrix. After procedure 316 the method proceeds to procedures 320.

In procedure 318, the bit loading tables are determined and transmitted to the CPEs. With reference to FIG. 3, dynamic bandwidth allocator 108 determines the bit loading tables.

In procedure 320, the activation of the determined pre-coding matrices is indicated. With reference to FIG. 3, DP vectoring controller 114 indicates that the pre-coding matrices are active With reference to FIG. 11B, in procedure 340, downlink channel response and FEXT probing signals are received and locked thereto. With reference to FIG. 3, transceiver 120 receives the channel estimation probing signals and lock onto these received signals. After procedure 340, the method proceeds to procedures 342, and 348.

In procedure 342, uplink FEXT probing signals are transmitted. With reference to FIG. 3, CPE controller 126 transmits, via transceiver 120, the uplink FEXT probing signals.

In procedure 344, uplink SINR probing signals are transmitted. The uplink SINR probing signals are transmitted in response to a request from the DR With reference to FIG. 3, CPE controller 126 transmits, via transmitter 120, SINR probing signals.

In procedure 346, the downlink bit loading tables are received from the distribution point. With reference to FIG. 3, transceiver 120 receives the downlink bit loading tables.

In procedure 348, the downlink FEXT is estimated according to the received probing signals. With reference to FIG. 3, CPE controller 126 estimates the downlink FEXT.

In procedure 350, the downlink FEXT estimations are transmitted to the DP in response to a request from the DP. With reference to FIG. 3, CPE controller 126 transmits via transmitter 120 the downlink FEXT estimations.

In procedure 352, downlink SINR probing signals are received and the downlink SINR is estimated in response to an indication received from the distribution point. The DP transmits an indication that the SINR probing signals are about to be transmitted. Once receiving this indication, the CPE receives the downlink SINR probing signal and estimates the downlink SINR. With reference to FIG. 3, CPE controller 126 estimates the downlink SINR.

In procedure 354, the uplink bit loading tables are determined and transmitted to the DP. With reference to FIG. 3, CPE controller 126 determines the bit loading tables and transmits these bit loading tables to DP 102 via transceiver 120.

It will be appreciated by persons skilled in the art that the disclosed technique is not limited to what has been particularly shown and described hereinabove. Rather the scope of the disclosed technique is defined only by the claims, which follow.

The invention claimed is:

1. A transmission scheme between a plurality of transceiver pairs, each transceiver pair including a respective first transceiver and a respective second transceiver, each transceiver including a transmitter and a receiver, each transceiver pair defining a downlink between the transmitter of said respective first transceiver and the receiver of said respective second transceiver and further defining an uplink between the transmitter of said respective second transceiver and the receiver of said respective first transceiver, the first transceivers of said transceiver pairs being located in a device supporting a plurality of links, each link connecting a respective transceiver pair, each transceiver pair transmitting data over a data transmission frame, said data transmission frame includes a plurality of time slots for transmitting data symbols, said transmission scheme including:

partitioning said frame in time into three mutually exclusive time zones, said time zones including an downlink zone, followed by a downlink\uplink zone, followed by an uplink zone, said downlink zone being for downlink transmission by said transmitter of said first transceiver, said uplink zone being for uplink transmission by said transmitter of said second transceiver, said downlink\uplink zone being for at least one of providing additional time slots for downlink transmission by said transmitter of said first transceiver and providing additional time slots for uplink transmission by said transmitter of said second transceiver, wherein, the allocated uplink time slots in said downlink\uplink zone for each transceiver pair, do not overlap in time with the allocated downlink time slots in said downlink\uplink zone for any other of said transceiver pairs, so as to avoid concurrent transmission of said respective first transceiver of one transceiver pair with said respective second transceiver of another transceiver pair in said downlink\uplink zone.

2. The transmission scheme according to claim 1, wherein each said respective second transceiver detects an end of said downlink transmission of said first transceiver prior to transmitting.

3. The transmission scheme according to claim 1, wherein each said respective first transceiver communicates to said respective second transceiver at least one of the duration of said downlink transmission and a duration of said uplink transmission.

4. The transmission scheme according to claim 3, wherein said duration of said downlink transmission and said duration of said uplink transmission are defined in by a number of symbols and corresponding symbol duration.

5. The transmission scheme according to claim 1, wherein said additional time slots are allocated to at least one of said respective first transceivers and said respective second transceivers.

6. The transmission scheme according to claim 1, wherein said frame exhibit the same partition for all transceiver pairs.

7. The transmission scheme according to claim 6, wherein said additional time slots are allocated when an amount of data required for transmission by at least one of said transceiver pairs, in one of said uplink and said downlink, exceeds the amount of data that can be transmitted in said one of said uplink and said downlink, the allocation of time slots in said downlink\uplink zone is coordinated between all transceiver pairs.

8. The transmission scheme according to claim 1 wherein a duration of each said time slots equals the duration of a symbol.

* * * * *